United States Patent
Corbalis et al.

(10) Patent No.: US 7,496,252 B1
(45) Date of Patent: Feb. 24, 2009

(54) OPTICAL SWITCH FABRIC WITH REDUNDANCY

(75) Inventors: Charles Matthew Corbalis, Saratoga, CA (US); Roger Jonathan Helkey, Montecito, CA (US); Walt Joseph Fant, Los Gatos, CA (US)

(73) Assignee: Calient Networks, Inc., San Jose, CA (US)

( * ) Notice: Subject to any disclaimer, the term of this patent is extended or adjusted under 35 U.S.C. 154(b) by 539 days.

(21) Appl. No.: 11/107,245

(22) Filed: Apr. 14, 2005

Related U.S. Application Data

(62) Division of application No. 09/876,715, filed on Jun. 6, 2001, now Pat. No. 6,882,766.

(51) Int. Cl.
*G02B 6/26* (2006.01)
*G02B 6/42* (2006.01)
(52) U.S. Cl. .......................................... 385/16; 385/17
(58) Field of Classification Search .................. 385/16, 385/17
See application file for complete search history.

(56) References Cited

U.S. PATENT DOCUMENTS

| | | | |
|---|---|---|---|
| 4,365,863 A | | 12/1982 | Broussaud |
| 4,400,627 A | * | 8/1983 | Zola ........................... 307/115 |
| 4,731,825 A | | 3/1988 | Wojcinski et al. |
| 4,837,855 A | | 6/1989 | Hajikano et al. |
| 4,848,999 A | | 7/1989 | Taylor |
| 4,894,818 A | | 1/1990 | Fujioka et al. |
| 5,016,966 A | | 5/1991 | Bowen et al. |
| 5,204,922 A | | 4/1993 | Weir et al. |
| 5,440,654 A | | 8/1995 | Lambert, Jr. |

(Continued)

FOREIGN PATENT DOCUMENTS

DE   197 57 181 A1   7/1999

(Continued)

OTHER PUBLICATIONS

Lena Wosinska, et al., "Large-Capacity Strictly Nonblocking Optical Cross-Connects Based on Microelectrooptomechanical Systems (MEOMS) Switch Matrices: Reliability Performance Analysis," Journal of Lightwave Technology, vol. 19, No. 8, pp. 1065-1075 (Aug. 2001).

(Continued)

*Primary Examiner*—Hae Moon Hyeon
(74) *Attorney, Agent, or Firm*—Blakely, Sokoloff, Taylor & Zafman LLP

(57) ABSTRACT

An optical switch fabric with an input stage, an output stage, and a center stage coupled in a cascaded manner. The center stage includes (1) a minimum number of center switches greater than one that cause the optical switch fabric to be strict-sense nonblocking and (2) at least one additional center switch to provide redundancy for the optical switch fabric. A module is described that includes optical input and output switches coupled to an optical center stage of an optical switch fabric. The module includes an interior cavity that contains free space beams from both the optical input switch and the optical output switch. A method is described for reconfiguring a redundant optical switch into a multilevel optical switch without interrupting operation of the signals carried by the optical switch by adding additional switch components and reconfiguring the fiber interconnection between switch elements.

16 Claims, 16 Drawing Sheets

U.S. PATENT DOCUMENTS

| | | | |
|---|---|---|---|
| 5,450,074 A * | 9/1995 | Yoshifuji | 340/2.22 |
| 5,450,512 A | 9/1995 | Asakura | |
| 5,457,556 A | 10/1995 | Shiragaki | |
| 5,459,606 A | 10/1995 | Baranyai et al. | |
| 5,467,191 A | 11/1995 | Kishner | |
| 5,471,332 A | 11/1995 | Shiragaki et al. | |
| 5,488,862 A | 2/1996 | Neukermans et al. | |
| 5,524,153 A | 6/1996 | Laor | |
| 5,555,330 A | 9/1996 | Pan et al. | |
| 5,555,558 A | 9/1996 | Laughlin | |
| 5,568,575 A | 10/1996 | Sato | |
| 5,629,790 A | 5/1997 | Neukermans et al. | |
| 5,754,120 A | 5/1998 | Argentati | |
| 5,805,320 A | 9/1998 | Kuroyanagi et al. | |
| 5,872,880 A | 2/1999 | Maynard | |
| 5,878,177 A | 3/1999 | Karasan et al. | |
| 5,903,686 A | 5/1999 | MacDonald | |
| 5,945,922 A | 8/1999 | Gao et al. | |
| 5,960,133 A | 9/1999 | Tomlinson | |
| 5,963,682 A | 10/1999 | Dorschner et al. | |
| 6,002,818 A | 12/1999 | Fatehi et al. | |
| 6,005,998 A | 12/1999 | Lee | |
| 6,044,705 A | 4/2000 | Neukermans et al. | |
| 6,049,412 A | 4/2000 | Bergmann et al. | |
| 6,097,858 A | 8/2000 | Laor | |
| 6,097,859 A | 8/2000 | Solgaard et al. | |
| 6,097,860 A | 8/2000 | Laor | |
| 6,101,299 A | 8/2000 | Laor | |
| 6,115,517 A | 9/2000 | Shiragaki et al. | |
| 6,124,956 A | 9/2000 | Severn | |
| 6,198,856 B1 | 3/2001 | Shroeder | |
| 6,233,072 B1 | 5/2001 | Liu et al. | |
| 6,236,481 B1 | 5/2001 | Laor | |
| 6,249,626 B1 | 6/2001 | Bergmann | |
| 6,253,001 B1 | 6/2001 | Hoen | |
| 6,278,812 B1 | 8/2001 | Lin et al. | |
| 6,289,145 B1 | 9/2001 | Solgaard et al. | |
| 6,289,148 B1 | 9/2001 | Lin et al. | |
| 6,292,597 B1 | 9/2001 | Lagali et al. | |
| 6,295,154 B1 | 9/2001 | Laor et al. | |
| 6,307,653 B1 | 10/2001 | Bala et al. | |
| 6,317,529 B1 | 11/2001 | Kashima | |
| 6,317,530 B1 | 11/2001 | Ford | |
| 6,320,993 B1 | 11/2001 | Laor | |
| 6,327,398 B1 | 12/2001 | Solgaard et al. | |
| 6,330,102 B1 | 12/2001 | Daneman et al. | |
| 6,337,760 B1 | 1/2002 | Huibers et al. | |
| 6,347,167 B1 | 2/2002 | Hagelin | |
| 6,366,713 B1 * | 4/2002 | Lin et al. | 385/16 |
| 6,396,602 B1 | 5/2002 | Kaiser et al. | |
| 6,396,976 B1 | 5/2002 | Little et al. | |
| 6,411,751 B1 | 6/2002 | Giles et al. | |
| 6,456,751 B1 | 9/2002 | Bowers et al. | |
| 6,466,711 B1 | 10/2002 | Laor et al. | |
| 6,473,544 B1 | 10/2002 | Daneman et al. | |
| 6,483,961 B1 | 11/2002 | Helkey et al. | |
| 6,483,962 B1 | 11/2002 | Novothy | |
| 6,487,329 B2 | 11/2002 | Foltzer | |
| 6,542,655 B1 | 4/2003 | Dragone et al. | |
| 6,549,691 B1 | 4/2003 | Street et al. | |
| 6,549,692 B1 | 4/2003 | Harel et al. | |
| 6,560,384 B1 | 5/2003 | Helkey et al. | |
| 6,567,576 B2 | 5/2003 | MacDonald | |
| 6,585,383 B2 | 7/2003 | Helkey | |
| 6,587,611 B1 | 7/2003 | Hunt | |
| 6,610,974 B1 | 8/2003 | Hunt et al. | |
| 6,668,108 B1 | 12/2003 | Helkey et al. | |
| 6,882,766 B1 | 4/2005 | Corbalis et al. | |
| 7,248,760 B1 | 7/2007 | Corbalis et al. | |
| 2002/0159681 A1 | 10/2002 | MacDonald | |
| 2003/0091271 A1 | 5/2003 | Dragone et al. | |

FOREIGN PATENT DOCUMENTS

| | | |
|---|---|---|
| EP | 1 120 989 A1 | 8/2001 |
| EP | 1 120 677 A2 | 8/2001 |
| JP | 5-107485 A | 4/1993 |
| JP | 2000-19434 | 1/2000 |
| WO | WO 99/66354 A2 | 12/1999 |
| WO | WO 00/20899 A2 | 4/2000 |
| WO | WO 01/33898 A2 | 5/2001 |
| WO | WO 01/39413 A2 | 5/2001 |

OTHER PUBLICATIONS

U.S. Appl. No. 60/293,197, filed May 25, 2001 (referred to in U.S. Patent Application Publication No. 2002/0159681 A1, published Oct. 8, 2002).

Lin L. Y. et al., "Micro-electro-mechanical systems (MEMS) or WDM optical-crossconnect Networks" Military Communications Conference Proceedings, 1999. Milcom 1999. IEEE Atlantic City, NJ, USA Oct. 31-Nov. 3, 1999, Piscataway, NJ, USA, IEEE, US, Oct. 31, 1999, pp. 954-957, XP01036982, ISBN: 0-7803-5538-5. 3.

"Lucent's New All-Optical Router Uses Bell Labs Microscopic Mirrors," Bells Labs press release, pp. 1-4, Nov. 10, 1999. http://www.bell-labs.com/news/1999/november/10/1.html.

D.T. Neilson, V.A. Aksyuk, S. Arney, N.R. Basavanhally, K.S. Bhalla, D.J. Bishop, B.A. Boie, C.A. Bolle, J.V. Gates, A.M. Gottlieb, J.P. Hickey, N.A. Jackman, P.R. Kolodner, S.K. Korotky, B. Mikkelsen, F. Pardo, G. Raybon, R. Ruel, R.E. Scotti, T.W. Van Blarcum, , L. Zhang, and C.R. Giles, "Fully Provisional 112×112 Micro-Mechanical Optical Crossconnect With 35.8Tb/s Demonstrated Capacity," OFC 2000 Tech. Dig., Baltimore, Maryland, pp. 202-204 (Mar. 7-10, 2000).

V.A. Aksyuk, F. Pardo, C.A. Bolle, S. Arney, C.R. Giles, and D.J. Bishop, "Lucent Microstar Micromirror Array Technology for Large Optical Crossconnects," XP-001038165, Proceedings of the SPIE, Spie, Bellingham, VA, USA, vol. 4178, pp. 320-324 (2000).

Michael A. Gallo and William M. Hancock, "Networking Explained," Butterworth-Heinemann, pp. 174-175 (1999).

Thomas E. Stern and Krishna Bala, "Multiwavelength Optical Networks A Layered Approach," Addison Wesley, pp. 39-46 (May 13, 1999).

* cited by examiner

OPTICAL SWITCH FABRIC WITH REDUNDANCY

The present application is a divisional of U.S. patent application Ser. No. 09/876,715, filed Jun. 6, 2001 now U.S. Pat. No. 6,882,766.

FIELD OF THE INVENTION

The present invention relates to the field of optical switches for fiberoptic networks. More particularly, the present invention relates to multistage optical switch architectures with input/output switch modules and redundant switches, and to methods for upgrading switch fabrics.

BACKGROUND

The use of fiberoptic networks is increasing due to the high bandwidth provided by such networks for transporting data, voice, and video traffic. Large switches would help to accommodate the switching needs of many of the larger fiberoptic networks, especially the high-capacity fiber backbones.

One disadvantage of certain prior art optical switches is that although optical signals can propagate almost losslessly while confined in optical fiber, the size of certain prior art optical switches is typically limited by diffraction of optical beams as they propagate through free space inside the switches. Moreover, large optical switching devices can be difficult to construct given the large number of optical cables and beams and complex associated electrical connection issues. In short, large optical switches can be costly and unwieldy.

Various types of non-optical electrical switch fabrics have been used in the prior art for telephony and network applications. One of the simplest structures has been the crossbar switch. One problem with the crossbar switch is the quadratic growth of crosspoints as the switch gets larger, which can result in far more cross-points than necessary to create all possible permutation connections. For a permutation switch, connections between input and output ports are point to point—neither one-to-many nor many-to-one connections are permitted.

To avoid the problem of excess crosspoints found in a single large switch, techniques have been developed for cascading small electrical switches into a multistage switch fabric in order to make large electrical permutation switches.

Permutation switches can be classified in terms of their blocking characteristics. On a switch, requests for connection establishment and termination can occur at random points in time. A permutation switch is rearrangeable or rearrangeably nonblocking if there exists a set of paths through the switch fabric that realizes each of any possible connection states. The rearrangeable aspect means that it may be necessary to rearrange currently active connections to support a request for a new connection between a pair of idle input and output ports. Problems with rearrangeable nonblocking switches include the fact that the required device settings to route connections through the switch are not determined easily and that connections in progress may have to be interrupted momentarily while rerouting takes place to handle the new connections.

Wide-sense nonblocking networks or switches are those that can realize any connection pattern without rearranging active connections provided that the correct rule is used for routing each new connection through the switch fabric.

Strict-sense nonblocking networks or switches require no rearrangement of active connections and no complex routing algorithms. New connection requests are allowed to use any free path in the switch. Strict-sense nonblocking switching fabrics (also referred to as strictly nonblocking switches) typically require more hardware than wide-sense nonblocking and rearrangable switching fabrics, but avoid connection disruption and provide simplicity of routing.

One type of cascaded permutation switch topology is a Clos switch fabric, also referred to as a Clos network, a Clos switch matrix, or a Clos switch. Various Clos switch configurations can constructed. For example, some Clos switch fabrics can be strict-sense nonblocking, other Clos switch fabrics can be wide-sense nonblocking, and others can be blocking. The blocking configurations are less useful, given that some combinations of input and output connections cannot be made.

FIG. 1 shows a three-stage Clos switch fabric that is strict-sense nonblocking, meaning that any input can be routed to any output at any time. The Clos switch fabric of FIG. 1 has N inputs, N outputs, K input stage switches, 2p−1 center stage switches, and K output stage switches. Each input stage switch has p inputs and 2p−1 outputs. Each center stage switch has K inputs and K outputs. Each output stage switch has 2p−1 inputs and p outputs.

One disadvantage of the strict-sense nonblocking Clos switch fabric of FIG. 1 is the lack of redundancy in switch connections. Redundancy is a desirable characteristic in a switch fabric because redundancy helps to permit rerouting in the event of a failure, the use of extra paths for test purposes during switch operation, and switch reconfiguration during switch operation.

SUMMARY OF THE INVENTION

An optical switch fabric is described that has an input stage, an output stage, and a center stage coupled in a cascaded manner. The center stage includes (1) a minimum number of center switches greater than one that cause the optical switch fabric to be strict-sense nonblocking and (2) at least one additional center switch to provide redundancy for the optical switch fabric.

A module is described that includes an optical input switch of an input stage of an optical switch fabric, an optical output switch of an output stage of the optical switch fabric, and an interior cavity. The input and output stages are coupled to a center stage of the optical switch fabric. The interior cavity contains free space beams from both the optical input switch and the optical output switch.

A method is described for reconfiguring an optical switch without interrupting working optical signals.

Other features and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A high availability optical switch fabric or matrix is described that uses a Clos multistage architecture.

As will be described in more detail below, for one embodiment an additional center stage switch is added to a strict-sense nonblocking optical Clos switch fabric to provide redundancy. An intended advantage of the embodiment is to provide a large capacity optical switch that is easier to construct given that is comprised of a number of smaller optical switches. Another intended advantage is the capability of providing both working and protection (i.e., test) connections and yet have the working connections be strict-sense nonblocking. A further intended advantage includes an enhanced ability to reroute connections during failure. Another intended advantage of the redundant Clos switch fabric is that it is amendable to switch fabric reconfiguration and upgrades while live traffic is being carried, thereby helping to minimize service disruptions.

An embodiment is described wherein input stage switches and output stage switches are combined to form Clos input/output modules ("CIO modules"). An intended advantage of this embodiment is to minimize switch granularity as compared with separate input stage switch modules and output stage switch modules. Other intended advantages include cost minimization and modularity to help to facilitate switch fabric upgrades.

Methods are also described for upgrading switch fabrics into large redundant Clos switch fabrics while those switch fabrics carry live traffic. Intended advantages of the methods include minimizing service disruption, providing various flexible upgrade paths, and providing the ability to reuse at least some existing equipment, thereby helping to minimize costs.

Figure 2:
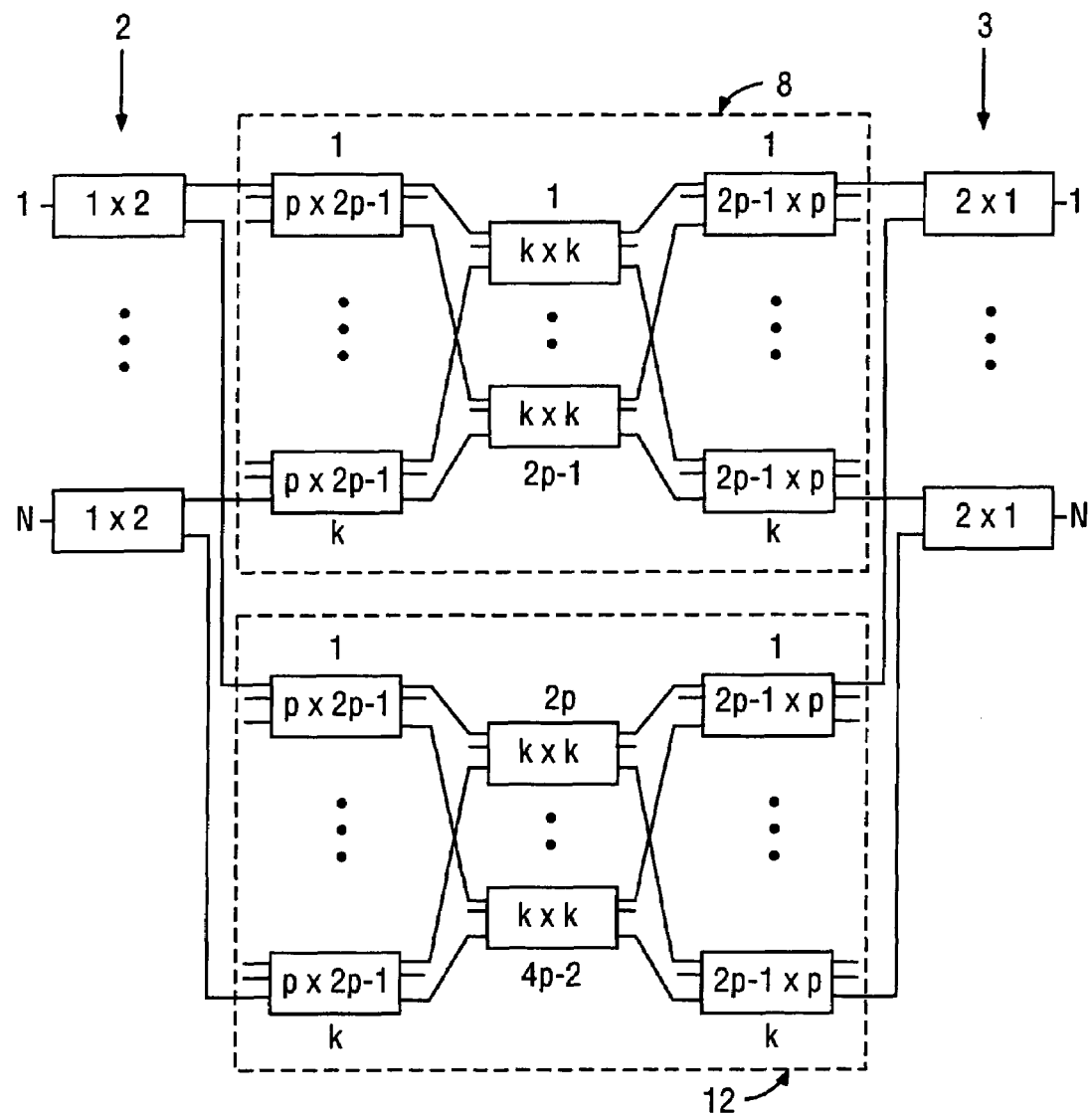
FIG. 2 shows a multistage Clos switching fabric with external 1×2 switches and 2×1 switches for redundancy.

One way to add redundancy to a strict-sense nonblocking Clos switch fabric is shown in FIG. 2. In FIG. 2, optical protection switches (1×2 and 2×1) are placed at the respective input 2 and output 3 optical switch stages and an identical redundant three-stage optical Clos switch 12 is added to the original three-stage optical Clos switch 8.

Figure 3:
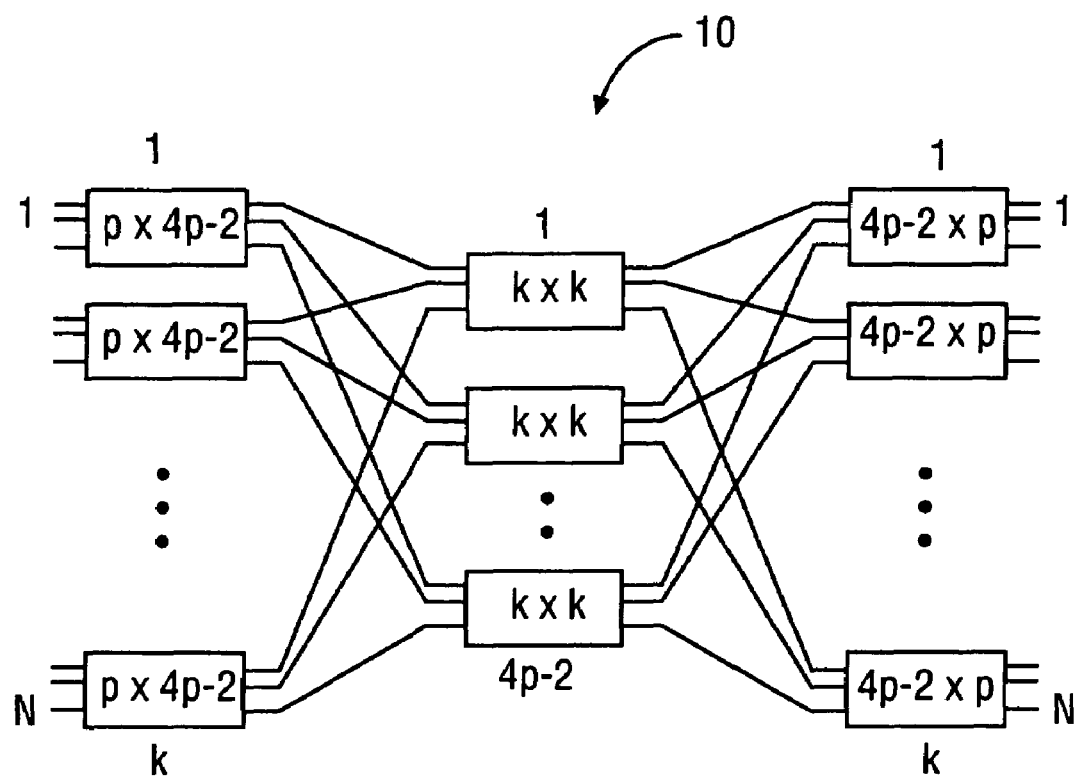
FIG. 3 shows a Clos switch fabric with redundancy input and output stage switches.

FIG. 3 shows a simplified version of the redundant Clos network of FIG. 2. In the redundant Clos optical switch fabric 10 of FIG. 3, each 1×2 protection switch and each of two corresponding p×(2p−1) switches of the switch fabric of FIG. 2 are combined into one p×(4p−2) switch. The output stage (2p−1)×p switches and the 2×1 protection switches are similarly combined into (4p−2)×p switches. This allows the optical switch fabric 10 of FIG. 3 to eliminate the protection switches (1×2 and 2×1) of FIG. 2, even though the switch fabric of FIG. 3 maintains a redundancy similar to that of the switch fabric of FIG. 2. The switch configurations of FIGS. 2 and 3 achieve redundancy through the use of a large number of components and, accordingly, there is an increase in complexity.

Figure 4:
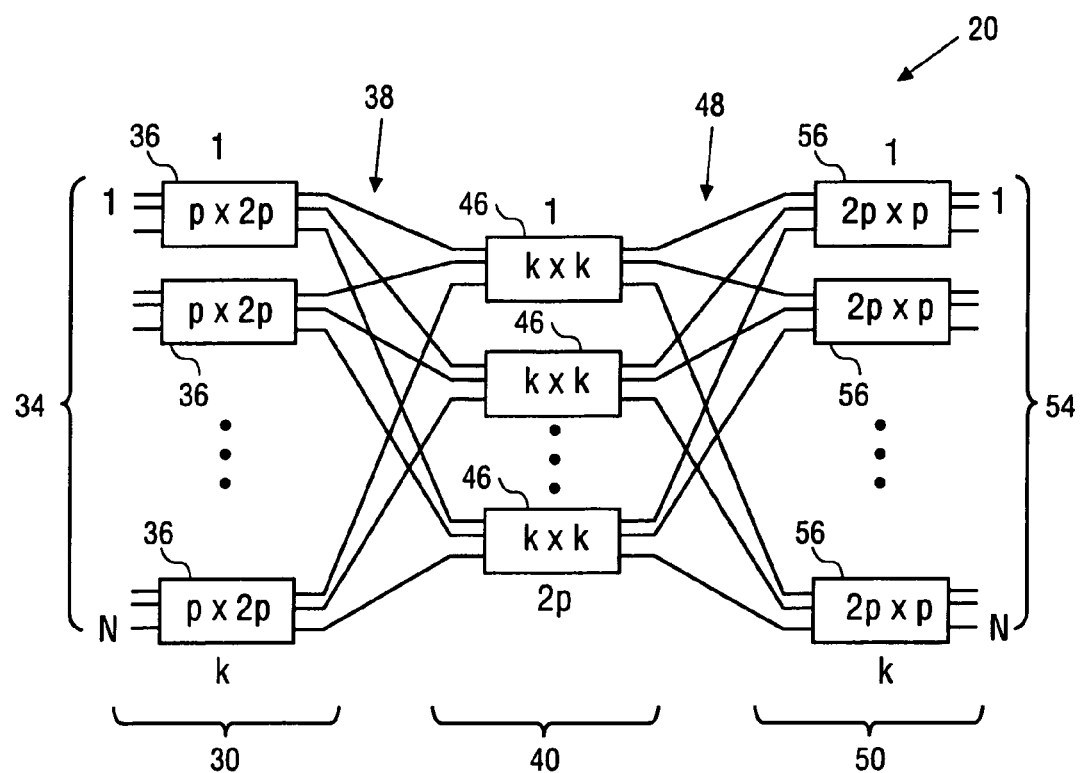
FIG. 4 illustrates a redundant Clos switch fabric that includes an additional center stage switch.

FIG. 4 illustrates an optical Clos switch fabric 20 that is strict sense nonblocking and is fully redundant. Redundancy is achieved in the switch fabric 20 by the inclusion of an additional center stage switch 46. Switch fabric 20 is also referred to as switch matrix 20, network 20, multilevel switch 20, multistage switch 20, or simply switch 20.

The Clos switch fabric 20 has an input stage 30, a center stage 40, and an output stage 50. The input stage 30 is coupled to the center stage 40 via fiber optic interconnect lines 38. The center stage 40 is coupled to the output stage 50 via fiber optic interconnect lines 48.

The input stage 30 comprises K optical input switches 36. K is an integer. Each of the input switches 36 has P inputs and 2p outputs. P is an integer. There are N inputs 34 to the input stage 30. N is an integer. The inputs 34 are divided evenly between the switches 36 so each switch has N divided by K number of inputs. Therefore, P equals N divided by K.

The 2P outputs of each input stage switch 36 are coupled to the center stage optical switches 46. Each output of each of the input stage switches 36 is coupled to one of the center stage switches 46 such that each switch 36 is coupled to each of the center stage switches 46.

For one embodiment, the number of center stage switches 46 is 2P, which equals the number of outputs of each input stage switch 36. Each of the center stage switches 46 has K inputs and K outputs. K equals the number of input stage switches 36.

The K outputs of center switches 46 are coupled to output optical switches 56 of output stage 50. Each of the output switches 56 has 2P inputs and P outputs. There are K switches 56 in output stage 50. There are N outputs 54 of output stage 50. Each of the outputs K of each center stage switch 46 is coupled to one of the switches 56 of output stage 50.

Redundancy is obtained in switch fabric 20 by adding an additional center stage switch 46 beyond the number of center stages switches required for the switch fabric to be strict-sense nonblocking. Thus, switch fabric 20 has 2P center stage switches 46. This differs from the prior art switch fabric shown in FIG. 1, which only has 2P−1 center stage switches. For the switch fabric 20 shown in FIG. 4, each of the input stage switches 36 has an extra output as compared to the input stage switches of the prior art switch fabric shown in FIG. 1. In addition, each of the output stage switches 56 shown in FIG. 4 has an additional input as compared to the output stage switches of the prior art switch fabric shown in FIG. 1.

Figure 1:
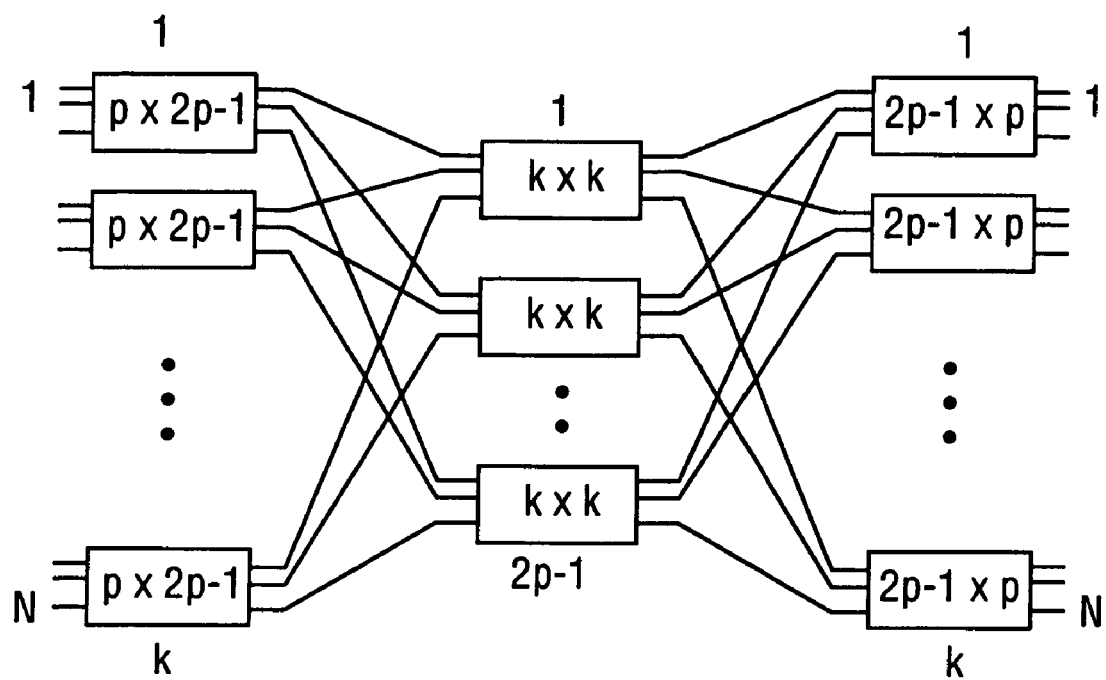
FIG. 1 shows a prior art multistage switching fabric with a Clos architecture.

The switch fabric 20 shown in FIG. 4 is more reliable than the prior art switch shown in FIG. 1 because the switch fabric 20 is fully redundant. Moreover, switch fabric 20 has fewer center stage switches and fewer fiber interconnects between the center stage switches and the input and output switches than the switches shown in FIGS. 2 and 3 and thus is more efficient. In particular, switch fabric 20 has 2P center stage switches, which contrasts with the 4P−2 center stage switches of the switch fabrics of FIGS. 2 and 3. In addition, each input stage switch of the switch fabric shown in FIG. 3 has 4P−2 outputs and each output stage switch of that prior art switch fabric has 4P−2 inputs. In contrast, each of the input stage switches 36 of FIG. 4 has 2P outputs and each of the output stage switches 56 has 2P inputs.

The switch fabric 20 of FIG. 4 has one additional center stage switch 46 added for redundancy. For alternative embodiments, however, additional center stage switches 46 could be added for more redundancy. There need only be P center switches 46 to make switch fabric 20 rearrangeably nonblocking.

The center stage 40 of Clos switch fabric 20 of FIG. 4 has the capability of establishing two times the number of total possible connections in order for the switch fabric 20 to still be strict-sense nonblocking. Nevertheless, if switch fabric 20 is configured to be only rearrangeably nonblocking, then the center stage 40 need only have capacity for the total possible connections, rather than two times the number of total possible connections.

A protection path can be set up for every working path. If the working connections through the Clos switch fabric 20 must be strict-sense nonblocking, but the protection connections are allowed to be rearrangeably nonblocking, then it is possible to only require two times the number of total possible working connections (strictly K equals 2 times N) and yet have the capability of providing both working and protection connections. The establishment of any working connection must be able to preempt any protection connection. The establishment of any protection connection may require rearrangement of all of the other protection connections.

Figure 5:
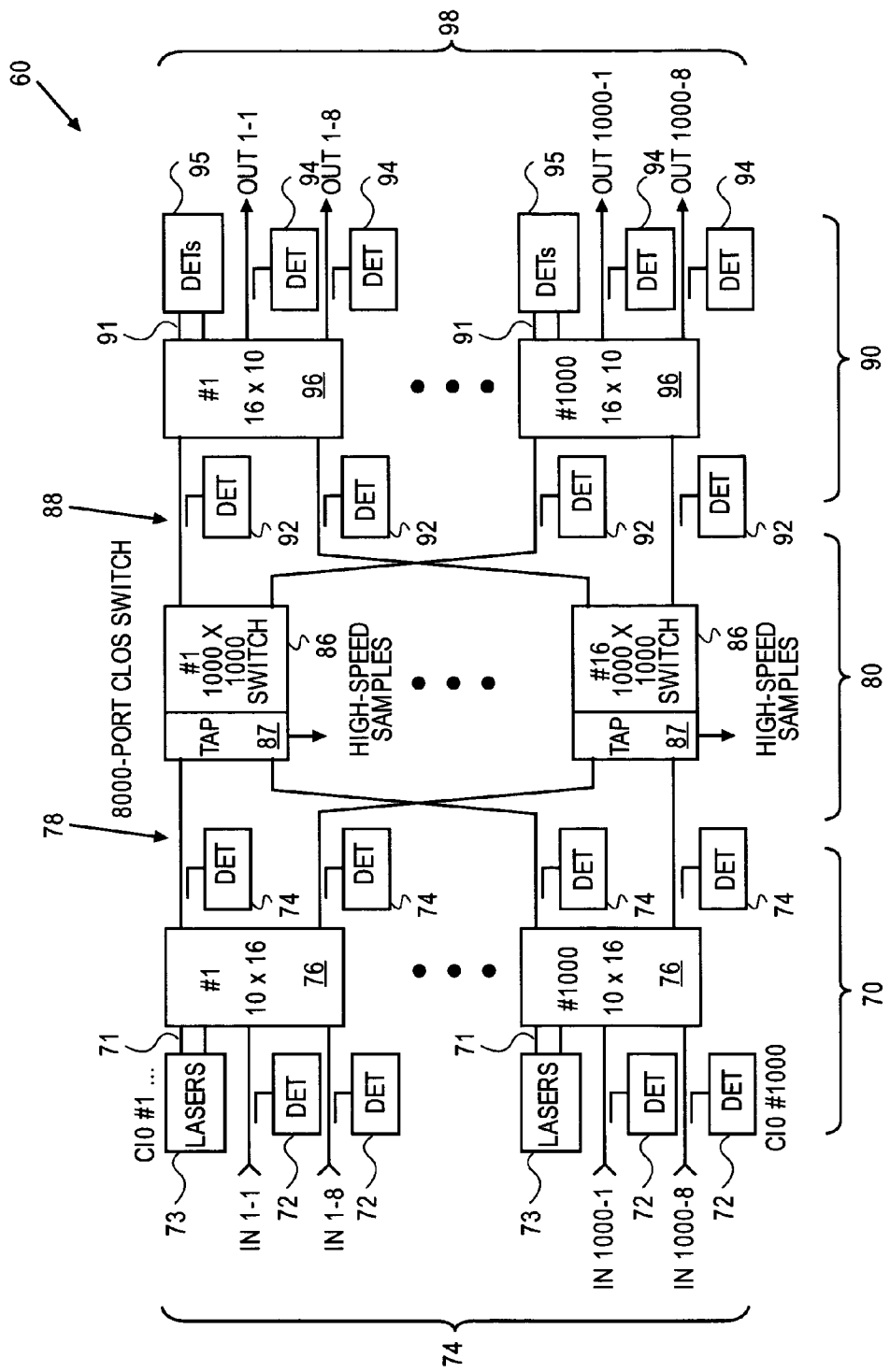
FIG. 5 shows an 8,000-port optical redundant Clos switch fabric that has 8-port input stage switches and 8-port output stage switches.

FIG. 5 shows an optical redundant Clos switch fabric 60 that has an input stage 70, a center stage 80, and an output stage 90. The switch fabric 60 has 8,000 input ports 74 and 8,000 output ports 98. The input stage 70 includes 1,000 optical input stage switches 76. The center stage 80 includes 16 optical center stage switches 86. The output stage 90 includes 1,000 optical output stage switches 96.

Each input stage switch 76 has eight inputs for working signals. In addition, each input stage switch 76 has two inputs 71 for the outputs of test source 73. Thus, each of the input stage switches 76 has ten inputs—i.e., eight working inputs IN 1-1 through IN 1-8, for example, and 2 test inputs 71. Lasers 73 provide the test light for the test signals. The test signals can be used for setting up protection paths.

The outputs of the test sources 73 can be routed to unused paths of the Clos switch fabric 60 to verify operation of all of the optical paths and to preconfigure the redundant center switch of center stage 80 with all the settings needed to replace any of the other center switches 86 should one of them fail. The test sources 73 may also be used to set up protection paths through unused ports in working switches.

Detectors 95, each of which contains two detectors, are coupled to each of the output switches 96 in order to allow monitoring of the test signals through the unused Clos switch paths.

The optical Clos switch fabric 60 of FIG. 5 differs from the prior art. One prior art Clos electrical switch fabric would have input switches with 15 outputs, 15 center switches with 1,000 inputs and 1,000 outputs, and output stages with 15 inputs. In contrast, Clos optical switch fabric 60 of FIG. 5 has redundancy by the addition of another switch output to each input stage switch 76, by the addition of another center stage switch 86, and by the addition of another input to each output stage switch 96.

Each of the center stage switches 86 of switch fabric 60 includes an internal optical tap 87 that allows substantially noninvasive real-time monitoring of any of the optical signals. The internal optical taps 87 in center stage switches 86 have the ability to provide high speed samples of the optical signals passing through switches 86.

The input stage 70 of input switch fabric 60 includes detectors 72 for monitoring optical signals provided as inputs to switch fabric 60. The input stage 70 also includes detectors 74 for monitoring optical signals from the outputs of input stage switches 76. Output stage 90 of switch fabric 60 includes detectors 92 for monitoring optical signals that are sent as inputs to output stage switches 96. Output stage 90 also includes detectors 94 for monitoring the output optical signals from output stage switches 96.

For alternative embodiments of the invention, switch fabric 60 of FIG. 5 could be larger or smaller, but still meet the relationships among K, P, and N of Clos switch fabric 20 of FIG. 4. For example, binary sequences can be used, such as K=1,024, P=8, and N=8,192. Alternatively, larger and smaller numbers can be used for K, P, and N.

For switch fabric 60 shown in FIG. 5, the input stage switches 76 and the output stage switches 96 are grouped together to form Clos input/output ("CIO") modules, which minimizes the switch granularity compared to having separate modules for input stage switches and separate modules for output stage switches. The functionality of the 10×16 optical input switches and the 16×10 optical output switches can be combined into one 26×26 optical switch.

Figure 6:
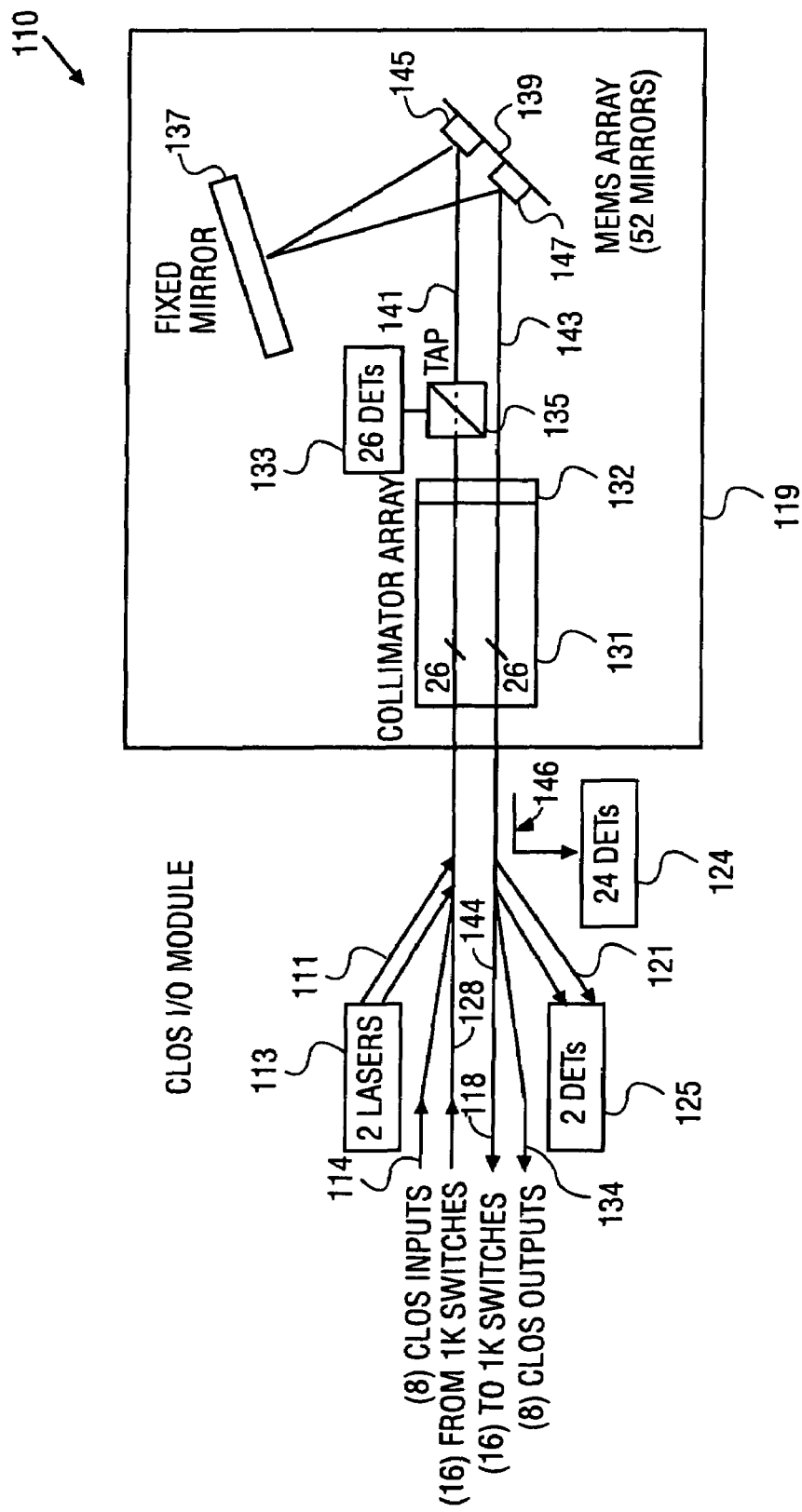
FIG. 6 illustrates the architecture of an optical Clos input/output module for a redundant Clos optical switch fabric.

FIG. 6 illustrates Clos input/output module 110, which is a 26×26 optical port switch that combines the functionality one of the 10×16 optical input stage switches 76 and one of the 16×10 optical output stage switches 96 of the switch fabric 60 of FIG. 5.

Clos I/O module 110 includes a housing 119 that encloses an array 139 of microelectromechanical ("MEMs") mirrors that includes an input beam mirror array 145 and an output beam mirror array 147. For one embodiment, the MEMs array 139 includes 52 working mirrors for the 26 input optical beams and the 26 output optical beams. For an alternative embodiment, the MEMS array 139 includes 64 mirrors, which includes 12 mirrors for redundancy. Also enclosed within housing 119 is a fixed mirror 137. Light beams 141 within housing 119 are reflected by input mirror array 145, then reflected by fixed mirror 137 then reflected by output mirror array 147 to form output optical beams 143.

Collimator array 131 holds the 26 input fiber lines and the 26 output fiber lines within housing 119. For an alternative embodiment, collimator array 131 also holds 12 fiber lines for redundancy, for a total of 64 fiber lines. Monolithic lens array 132 focuses or collimates the optical outputs of the fiber lines of collimator array 131 into beams 141. Lens array 132 also receives beams 143 and focuses them into the fiber lines that are carrying optical signals out of Clos I/O module 110.

Tap 135 is also enclosed within housing 119. Tap 135 permits substantially noninvasive optical power monitoring of optical beams 141. Tap 135 sends optical signals to 26 photodetectors 133 within housing 119 for optical input signal detection and monitoring.

Clos input/output module 110 is a 26×26 port optical switch, so there are twenty-six inputs and twenty-six outputs. The eight Clos module inputs 114 are the same as the inputs to an individual input stage switch 76 shown in FIG. 5, and thus are part of the inputs 74 to switch matrix 60.

Inputs 128 to Clos input/output module 110 are 16 outputs from one of the 1,000×1,000 port center stage switches 86 shown in FIG. 5. Thus, the optical signals on lines 128 are part of the signals carried by fiber lines 88 shown in FIG. 5.

Inputs 111 to the Clos I/O module 110 of FIG. 6 are two optical fibers for two test lasers 113. Test lasers 113 send optical test signals through inactive optical channels within Clos input/output module 110.

Two corresponding optical output detectors 125 are provided on the output side of Clos input/output module 110. Switch outputs not used for working signals send optical signals to the detectors 125 over two fiber lines 121 to allow detectors 125 to monitor inactive optical channels of Clos input/output module 110. These detectors 125 correspond to detectors 95 of FIG. 5.

Outputs 134 comprise eight optical Clos outputs from Clos input/output module 110. Outputs 134 correspond to the outputs of one of the output stage switches 96 shown in FIG. 5 and are part of the outputs 98 from switch fabric 60.

Further outputs from Clos input/output module 110 of FIG. 6 are the optical signals of fiber lines 118, which are 16 signals to be sent to the center stage switches 86 shown in FIG. 5. The sixteen signals on fiber lines 118 are part of the signals carried on connections 78 shown on FIG. 5.

Clos input/output module 110 also includes twenty-four optical detectors 124 for monitoring the output optical signals from Clos input/output module 110. Optical fiber power splitters 146 send optical signals to detectors 124. Detectors 124 comprise a combination of a detector 74 and a detector 94 of FIG. 5.

Thus, eight optical inputs 114 are switched among sixteen optical outputs 118, which in turn go to the center switches 86. Sixteen optical inputs 128 to Clos I/O module 110 coming from center switches 86 are switched among optical outputs 134.

For alternative embodiments, more than twenty-six input and output ports would be fabricated for the Clos input/output optics module 110 to allow for production yield. For the alternative embodiments, other parts of the module 110 would be larger, such as the mirror array. For other alternative embodiments, the Clos I/O module 110 could be smaller, with fewer than 26 respective input and output ports.

For an alternative embodiment of the invention, the twenty-four photo detectors 124 sampling the output signals and the two photo detectors 125 used to monitor inactive channels may be placed inside the housing 119 of the optics module by routing the coupled output fibers 144 back into the collimator array 131.

The cost of a large capacity optical switch with a Clos architecture like the switch fabric 60 of FIG. 5 can be dominated by a large number of small switches, which in this case are the 1,000 Clos input/output modules needed for an 8,000 port Clos switch, assuming the input and output stage switches 76 and 96 are combined into Clos input/output modules 110. The total cost of the sixteen center stage switches 86 is lower than the total cost of the 1,000 Clos input/output modules 110 formed by switches 76 and 96, even though the cost per switch is higher for the center stage switches 86. The reduced cost is due to the fact that there are only sixteen center stage switches 86 versus 1,000 Clos I/O modules 110.

For one embodiment of the invention, customers would be able to purchase expandable switch fabrics, where initially a small number of ports are purchased, but additional ports could be added as required.

One approach to an upgrade path for a switch fabric is to initially install the full set of center stage switches and install the Clos input/output modules (that form the input and output switch stages) as needed. For example, the 8,000 port switch fabric 60 shown in FIG. 5 initially could be used as a 2,000 port switch fabric by installing one fourth of the Clos input/output modules 110 that combine input switches 76 and output switches 96. Such a 2,000 port switch would retain all sixteen center stage switches 86. For this approach, however, the cost of the center stage switches 86 becomes a larger fraction of the initial cost of the switch fabric 60 because there are fewer Clos input/output modules 110 than with having 1,000 Clos input/output modules 110. For alternative embodiments, this approach could be used for smaller or larger switch fabrics.

For yet other alternative embodiments, a reverse approach can be used to downgrade capacity of a switch fabric. Clos input/output modules could be removed to lower switch capacity in a manner opposite to the upgrade approach.

Figure 7:
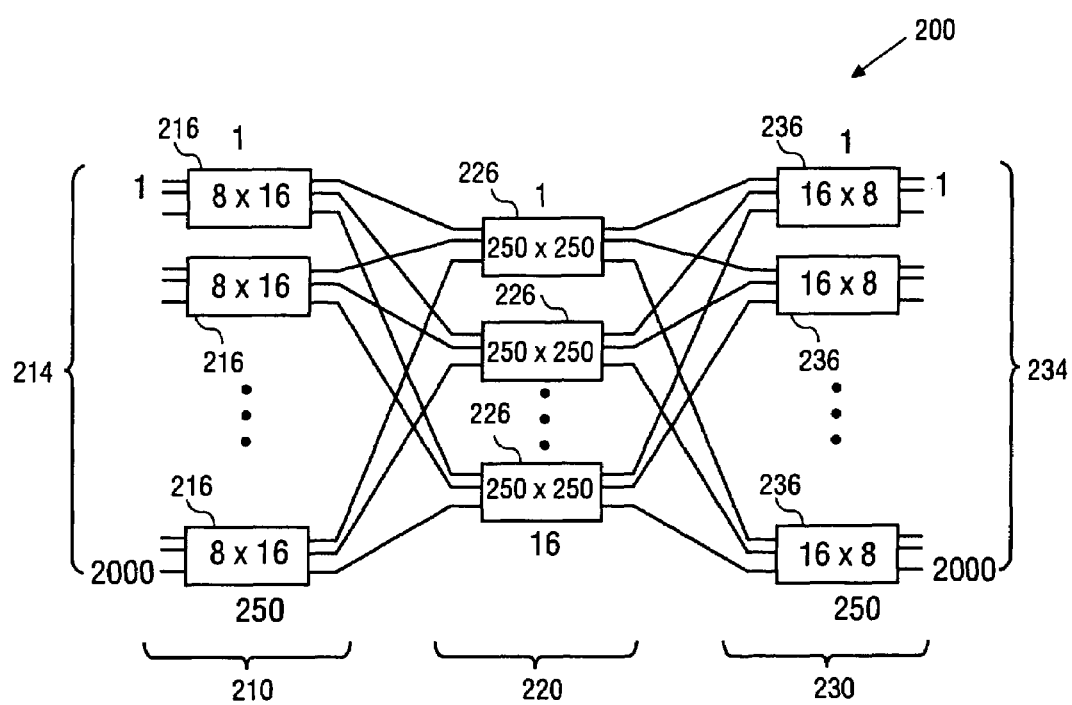
FIG. 7 shows a redundant Clos switch fabric with relatively small center stage switches.

Another way to reduce the initial cost of installing a portion of a large capacity optical switch is to initially install smaller center stage switches, which is shown by the switch fabric 200 in FIG. 7. Switch fabric 200 is a Clos multistage switch fabric containing input stage 210, center stage 220, and output stage 230. Instead of being configured as an 8,000 port switch fabric such as switch fabric 60 shown in FIG. 5, the switch fabric 200 is instead initially configured as a 2,000 port Clos switch fabric with one fourth of the Clos input/output modules as switch fabric 60. For switch fabric 200, the total number of inputs 214 is 2,000 and the total number of outputs 234 is 2,000. The switch fabric 200 of FIG. 7 has 16 center stage switches 26 that need only 250 input ports and 250 output ports. Therefore, each center stage switch 226 is a 250 by 250 port switch. Input stage 210 has 250 input stage switches 216 and output stage 230 includes 250 output stage switches 236.

For the sake of simplicity, the test and monitoring functions are not shown in the switch fabric 200 of FIG. 7. Each of the input stage switches 216 has eight inputs and sixteen outputs. Each of the output stage switches 236 has sixteen inputs and eight outputs. If the testing and monitoring functions were shown, then each of the input stage switches 216 would have ten inputs and each of the output stage switches 236 would have ten outputs.

For switch fabric 200, the input stage switches 216 and the output stage switches 236 are combined as Clos input/output modules.

The fiber routing between modules is unchanged when the switch fabric 200 is upgraded by upgrading the center switches 226 to 1,000 port by 1,000 port switches and by adding more Clos input/output modules. In other words, the center switches 226 are replaced by sixteen 1,000 port by 1,000 port center stage switches. Additional Clos I/O modules are added so that there are 1,000 input switches 216 and 1,000 output switches 236.

This upgrade approach has the disadvantage that the 250 port center stage switches 226 need to be replaced. Nevertheless, the center stage switches 226 may be reused in some other smaller capacity optical switch somewhere in the optical network.

For alternative embodiments, this upgrade approach could be used for smaller or larger switch fabrics.

For yet other alternatives embodiments, the upgrade approach can operate in reverse to downgrade switch fabric capacity. This downgrade path would be accomplished by replacing large center stage switches (such as 1,000 port×1,000 port center stage switches) with smaller center stage switches (such as 250 port by 250 port center stage switches).

Figure 8:
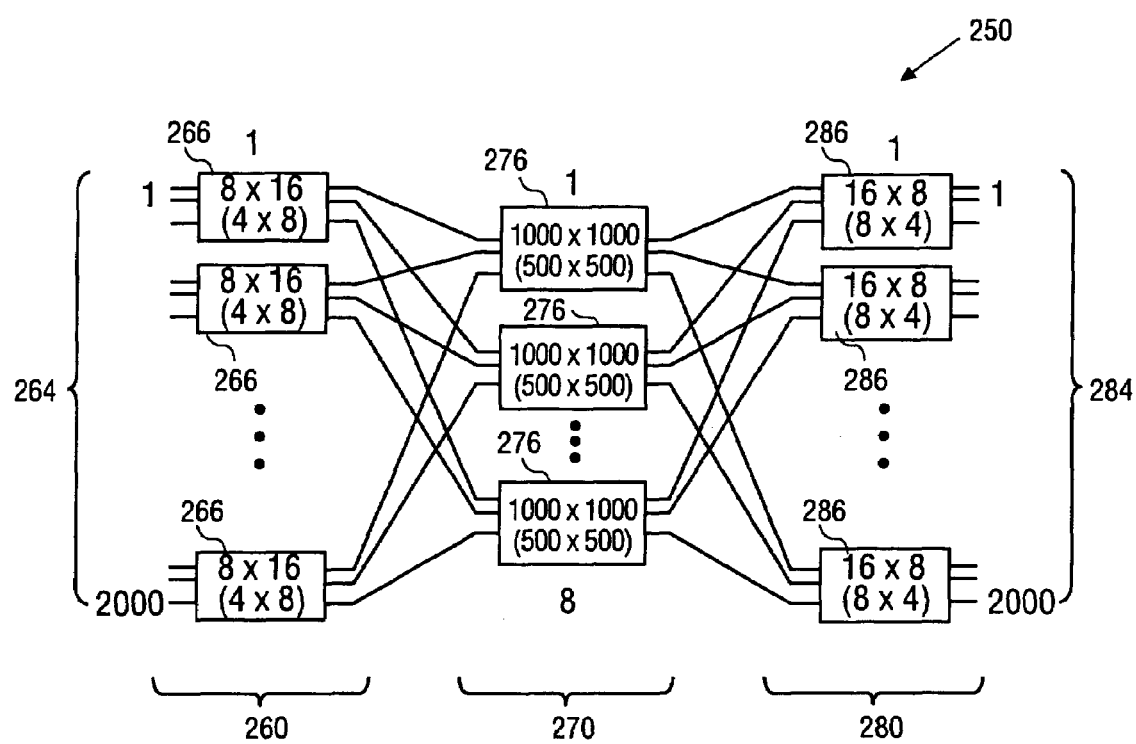
FIG. 8 shows a redundant Clos switch fabric with partially populated center switches.

Another upgrade approach is to use 1,000 port by 1,000 port center stage switches, but to install only a portion of them. FIG. 8 illustrates switch fabric 250 that uses this upgrade approach. For switch fabric 250, the fiber routing is unchanged as the switch fabric 250 is upgraded. Switch fabric 250 includes input stage 260, center stage 270, and output stage 280. Input stage 260 has 500 input stage switches 266. Center stage 270 has eight center stage switches 276. Output stage 280 has 500 output stage switches 286. For the initial configuration of switch fabric 250, there are 2,000 inputs 264 and 2,000 outputs 284.

The approach shown in FIG. 8 starts with partially populated center switches 276. For switch fabric 250, only one half of the 1,000 port by 1,000 port center switches 276 are loaded so there are only 8 center stage switches 270 in FIG. 8. Therefore, center stage switches 276 are only acting functionally as 500 port by 500 port switches. The eight port by sixteen port input stage switches 266 are only operating functionally as four inputs by eight outputs switches because only half of the center stage switches 256 are loaded as compared to switch fabric 60 shown in FIG. 5. Likewise, the sixteen port by eight port output stage switches 286 are only operating functionally as eight inputs by four outputs stage switches.

For the sake of simplicity, the test and monitoring functions are not shown for switch fabric 250. Therefore, the two additional inputs for each input stage switch 266 for test and monitoring functions are not shown. Likewise, the two additional output ports for test and monitoring for each of the output stage switches 286 are not shown.

The input stage switches 266 and the output stage switches 286 are combined into Clos input/output modules. One half of the Clos input/output modules need to be installed to realize a 2,000 port switch fabric, so this approach is most useful for small initial implementations where the benefit of not needing to replace the center stage switches 276 outweighs the inefficient utilization of the Clos input/output modules that comprise the input 266 and output 286 switches. The approach shown in FIG. 8 has the advantage that the switch fabric capability is doubled when the center stage switches 276 are fully installed without installing any additional Clos input/output modules. In other words, if eight additional 1,000 port center stage switches 276 are added to switch fabric 250, the capacity of switch fabric 250 doubles, and switch fabric 250 becomes a 4,000 port Clos switch. Once the eight additional center stage switches are added (resulting in sixteen center stage switches 276), then the input stage switches 266 begin to operate as eight inputs by sixteen outputs switches and the output stage switches 286 begin to operate as sixteen inputs by eight outputs switches. This results in the number of inputs 264 becoming 4,000 and the number of outputs 286 becoming 4,000. To further upgrade the switch fabric 250 to a 8,000 port Clos redundant strict sense nonblocking switch, 500 additional eight by sixteen port input stage switches 266 can be added and 500 additional sixteen by eight port output stage switches 286 can be added. The number of center stage 1,000 port by 1,000 port switches 276 remains at sixteen. Given that input stage switches 266 and output stages switches 286 are combined into Clos input/output modules, this means that only five hundred Clos input/output modules need to be added to make the switch fabric go from 2,000 ports to 8,000.

For alternative embodiments, this upgrade approach could be used for smaller or larger switch fabrics.

For yet other alternative embodiments, this upgrade approach can operate in reverse to downgrade switch fabric capacity. In other words, center stage switches and Clos input/output modules can be removed to lower capacity of the switch fabric in a manner that is the reverse of the upgrade path.

Another switch fabric upgrade path is shown with respect to FIGS. 9 through 16. This upgrade path is referred to as a fiber backplane upgrade. For the fiber backplane upgrade shown in FIGS. 9 through 16, the fiber routing is changed as the switch fabric is upgraded.

Figure 9:
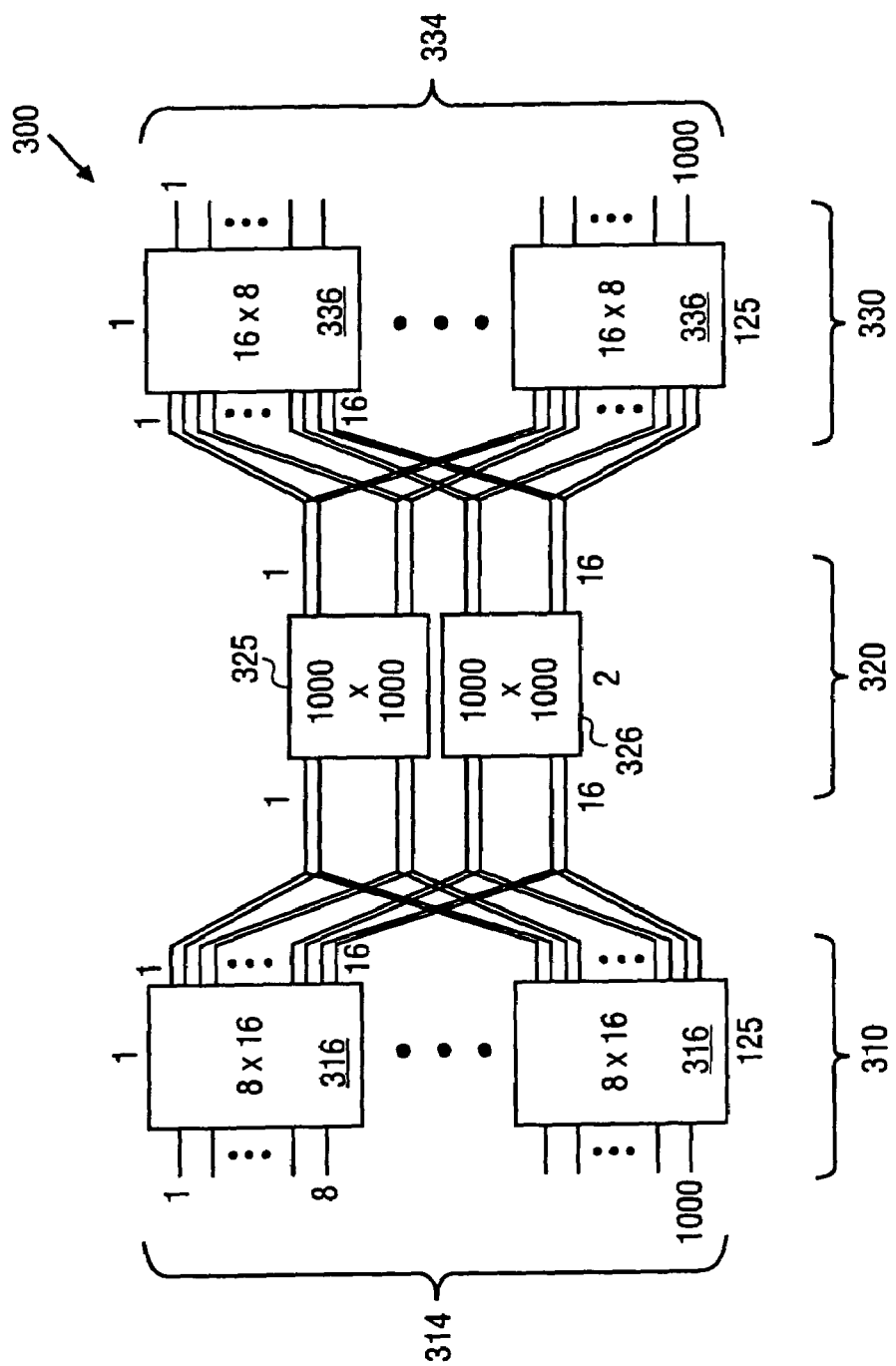
FIG. 9 illustrates a switch fabric that uses 125 Clos input/output modules and two 1,000-port switches.

This fiber backplane upgrade starts with switch fabric 300 shown in FIG. 9. Switch fabric 300 is a 1,000 port switch fabric using Clos components and Clos backplane wiring.

Switch fabric 300 includes input stage 310, center stage 320, and output stage 330. Input stage 310 includes 125 stage switches 316. Each input stage switch 316 is an eight port by sixteen port switch. Center stage 320 is made up of two center stage switches 325 and 326. Switches 325 and 326 are each a 1,000 port by 1,000 port switch. Output stage 330 comprises 125 output stage switches 336. Each of the output stages switches 336 is a sixteen port by eight port switch. There are 125 output stage switches 336. There are 1,000 optical inputs 314 applied to switch fabric 300. There are 1,000 optical outputs 334 from switch fabric 300.

For one embodiment, the input stage switches 316 and the output stage switches 336 are combined to form 125 Clos input/output modules.

For the sake of simplicity, the test and monitoring functions are not shown for switch fabric 300. If the test and monitoring functions were shown, then input stage switches 316 would have ten inputs each instead of eight, and output stage switches 336 would have ten outputs instead of eight.

The switch fabric 300 of FIG. 9 is generally not considered a Clos architecture given that the Clos input/output modules formed by input and output stage switches 316 and 336 are only functioning as respective one-by-two protection switches and two-by-one protection switches. Therefore, the second center stage switch 326 is redundant.

Switch fabric 300 shown in FIG. 9 depicts a fully loaded 1,000 port center switch configuration. For an alternative embodiment, however, center stage switches 325 and 326 initially could be smaller than 1,000 ports. For that alternative embodiment, the center stage switches 325 and 326 could be upgraded as Clos input/output modules (comprising input switches 316 and output 336) are added to switch fabric 300, while the same fiber backplane is maintained.

Switch fabric 300 has an optical backplane comprising sixteen fiber bundles or fiber cables, each with 250 fibers. There are 250 fibers in each bundle because the Clos input/output modules combine the 125 input stage switches 316 and the 125 output stage switches 336. Accordingly, one end of each fiber cable contains one output fiber and one input fiber with respect to each Clos input/output module in the switch fabric 300. These fibers are connected to different Clos input/output module fiber connectors. For one embodiment, there could be a single 32-fiber connector for each Clos input/output module. If test and monitoring functions are included in the switch fabric then the fiber connector for each Clos input/output module would be bigger than 32 fibers because it would include additional overhead fibers.

At the other end of each of the sixteen fiber cables, all 250 fibers terminate in a single fiber connector that goes to 125 input ports and 125 output ports of the corresponding center stage 320 switch—i.e., either center switch 325 or center switch 326. For the switch fiber 300 shown in FIG. 9, which has 1,000 port by 1,000 port center stage switches 325 and 326, all of the sixteen fiber cables terminate in the center stage 320.

Figure 10:
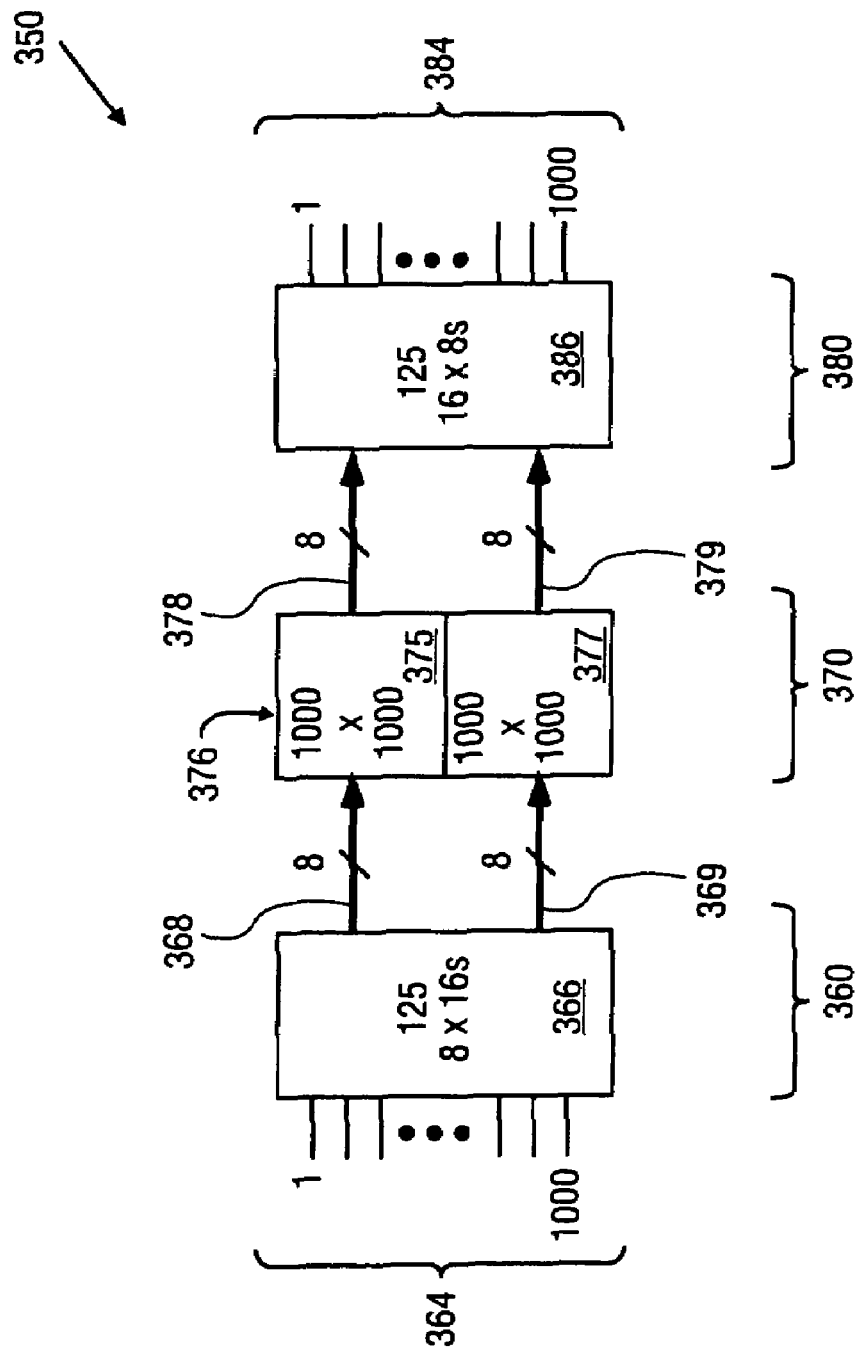
FIG. 10 is a simplified schematic of the switch fabric of FIG. 9 with the 8×16 input stage switches shown as a single box and the 16×8 output stage switches shown as a single box.

FIG. 10 illustrates switch fabric 350, which is a simplified schematic representation of the same 1,000 port switch configuration 300 shown in FIG. 9. Switch fabric 350 of FIG. 10 is also referred to as switch fabric subsystem 350, switch subsystem 350, or subsystem 350. For switch fabric 350, all of the 8 port by 16 port input stage switches 316 are shown as single switchbox 366 of input stage 360. Likewise, all of the 16 port by 8 port output stage switches 336 of FIG. 9 are shown in FIG. 10 as switchbox 386 of output stage 380. In addition, the center stage switches 325 and 326 of FIG. 9 are combined in FIG. 10 to form center stage switchbox 376, which comprises 1,000 port by 1,000 port switch 375 and 1,000 port by 1,000 port center stage switch 377 of center stage 370.

FIG. 10 shows eight fiber cables 368 connecting input stage switches 366 with center stage switch 375. FIG. 10 also shows eight fiber cables 369 connecting input stage switches 366 with center stage switch 377. Each of the eight fiber cables 368 has 125 fibers. Likewise, each of the fiber cables 369 has 125 fibers.

Fiber cables 378 comprise eight fiber cables connecting center stage switch 375 with output stage switches 386. Fiber cables 379 comprise eight fiber cables connecting center stage switch 377 with output stage switches 386. Each fiber cable of the eight fiber cables 378 has 125 fibers. Likewise, each of the eight fiber cables 379 has 125 fibers.

For one embodiment, the input stage switches 366 and output stage switches 386 are combined into Clos input/output modules. The fiber cables 368, 369, 378, and 379 are thus coupled to the Clos input/output modules as well as being coupled to the center stage switches 376. For Clos I/O modules, the fiber cables 368 and 378 would be combined and have 250 fibers, and the fiber cables 369 and 379 would be combined and have 250 fibers.

The switch fabric 350 thus represents a switch subsystem with 1,000 inputs 364 and 1,000 outputs 384. Fiber connectors may be moved by disconnecting a fiber connector from a 1,000 port switch subsystem such as subsystem 350 and moving the fiber connector to another 1,000 port switch subsystem. The fiber backplanes of these switch subsystems may be configured at the factory to connect to all of the Clos input/output modules. For one embodiment, only the large 250 port fiber connectors are reconfigured to change the overall switch fabric size.

Figure 11:
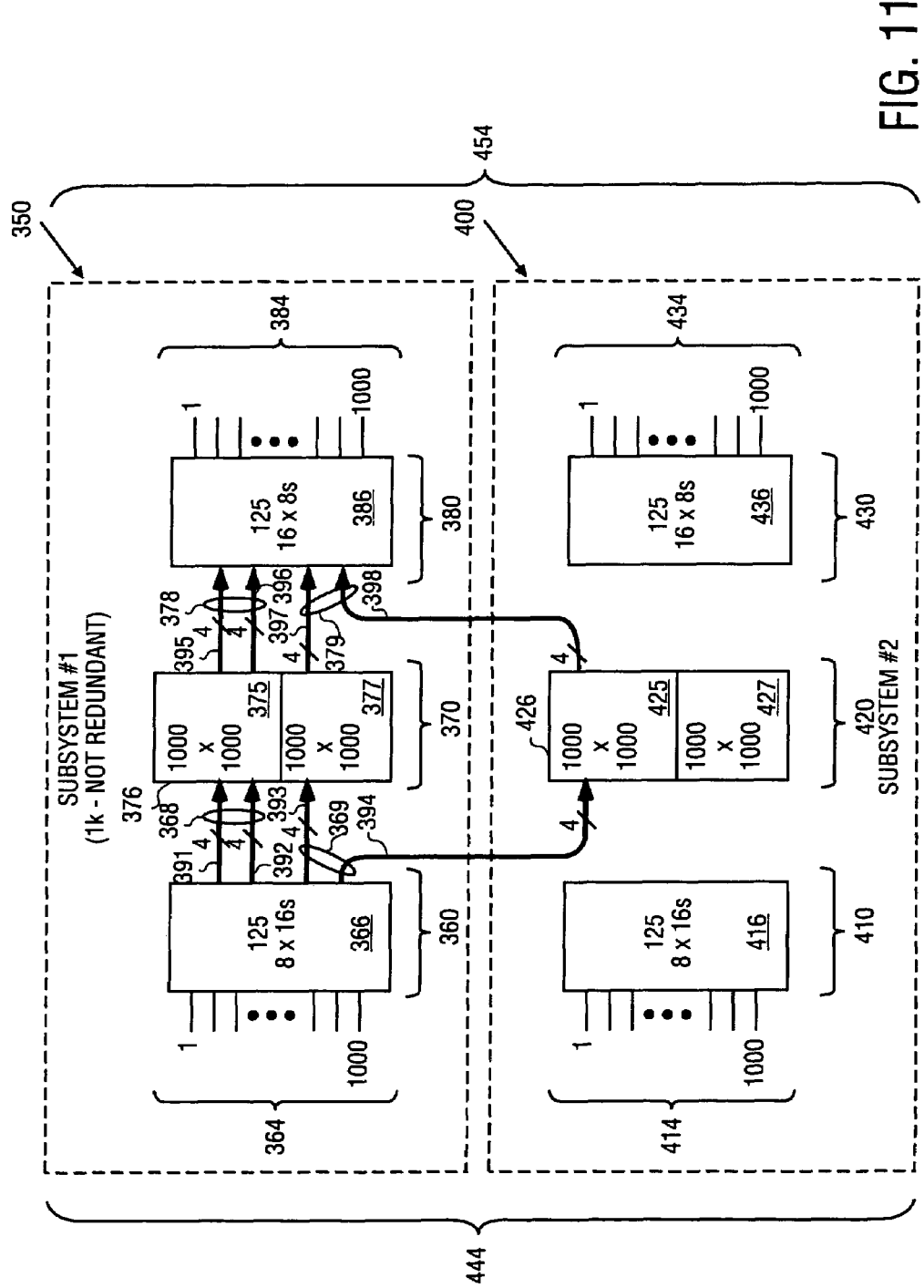
FIG. 11 shows a partial upgrade from a switch fabric that uses Clos input/output modules and two 1,000-port center switches to a redundant Clos switch fabric.

FIG. 11 shows a upgrade path for transitioning from the 1,000 port switch fabric 350 (of FIG. 10) with one-to-one protection to a 2,000 port Clos switch fabric while live traffic is being carried.

FIG. 11 shows switch fabric subsystems 350 and 400. Switch fabric subsystem 350 includes an input stage 360, a center stage 370, and an output stage 380. For subsystem 350, there are 1,000 inputs 364 and 1,000 outputs 384. Switch fabric 350 includes 125 eight port by sixteen port input stage switches 366 and 125 sixteen port by eight port output stage switches 386. For the sake of simplicity, test and monitoring functions are not shown for switch fabrics 350 and 400. Switch fabric 350 also includes center stage switches 376, which comprise 1,000 port by 1,000 port switch 375 and 1,000 port by 1,000 port switch 377.

Fiber bundle 368 is comprised of four fiber cables 391 and four fiber cables 392. Fiber bundle 369 is comprised of four fiber cables 393 and four fiber cables 394. Fiber bundle 378 is comprised of four fiber cables 395 and four fiber cables 396. Fiber bundle 379 is comprised of four fiber cables 397 and four fiber cables 398. For one embodiment, each fiber cable of fiber cables 391 through 398 is comprised of 125 optical fibers.

Switch fabric subsystem 400 includes input stage 410, center stage 420, and output stage 430. Subsystem 400 has 1,000 optical inputs 414 and 1,000 optical outputs 434. Input stage 410 is comprised of 125 eight port by sixteen port optical switches 416. Output stage 430 is comprised of 125 sixteen port by eight port optical output stage switches 436. Center stage 420 is comprised of center stage switches 426, which comprise 1,000 port by 1,000 port center stage switch 425 and 1,000 port by 1,000 port center stage switch 427.

Initially, switch fabric subsystem 350 is configured as shown in FIG. 10, with eight fiber bundles going to each center switch. Thus, eight fiber bundles 368 go to center stage switch 375, eight fiber bundles 369 go to center stage switch 377, eight fiber bundles 378 leave center switch 375, and eight fiber bundles 379 leave center stage switch 377.

In order to switch the fiber cables over to another subsystem while live traffic is being carried, all connections first are routed to one center stage switch. Therefore, for one embodiment, all connections are first routed to center stage switch 375. Four of the cables 394 from switch fabric subsystem 350 are routed to the second switch fabric subsystem 400 that has been added, as shown in FIG. 11. This moving of the cables 394 to subsystem 400 is done while fiber cables 391, 392, 395, and 396 continue to carry live traffic.

As shown in FIG. 11, fiber cables 394 are routed from input stage switches 366 of switch fabric 350 to center stage switch 425 of switch fabric 400. Likewise, fiber cables 398 are routed from center stage switch 425 of switch fabric 400 to output stage switches 386 of switch fabric 350. The switch fabric 350 is not fully redundant during this fiber reconfiguration given that there is not a backup to the 1,000 port by 1,000 port center stage switch 375 while the fiber cables are being rerouted. During this rerouting, all live traffic is carried through center stage switch 375.

The fiber bundles 391, 393, 394, 395, 397, and 398 can be used to form a 1,000 port Clos switch shown in FIG. 11 that includes subsystems 350 and 400. The input stage switches 366 and output stage switches 386 are combined to form Clos input/output modules. In addition, the input stage switches 416 and output stage switches 436 are combined into Clos input/output modules. For Clos I/O modules, each fiber cable pair 391/395, 392/396, 393/397, and 394/398 would be combined to form a fiber cable with 250 fibers.

After the rerouting of fiber cables 394 and 398 to center switch 425, the Clos input/output module switches of FIG. 11 can be partitioned into two port by four port input stage Clos switches and four port by two port output stage Clos switches instead of one port by two port protection switches and two port by one port protection switches. Consequently, all live traffic can then be shifted off of the fiber bundles 392 and 396 shown in FIG. 11. Live traffic would then be carried by fiber bundles 391, 393, 394, 395, 397, and 398. That transition of live traffic represents a transition from an unprotected 1,000 port switch fabric to an unprotected Clos 1,000 port switch fabric made up of subsystems 350 and 400.

Figure 12:
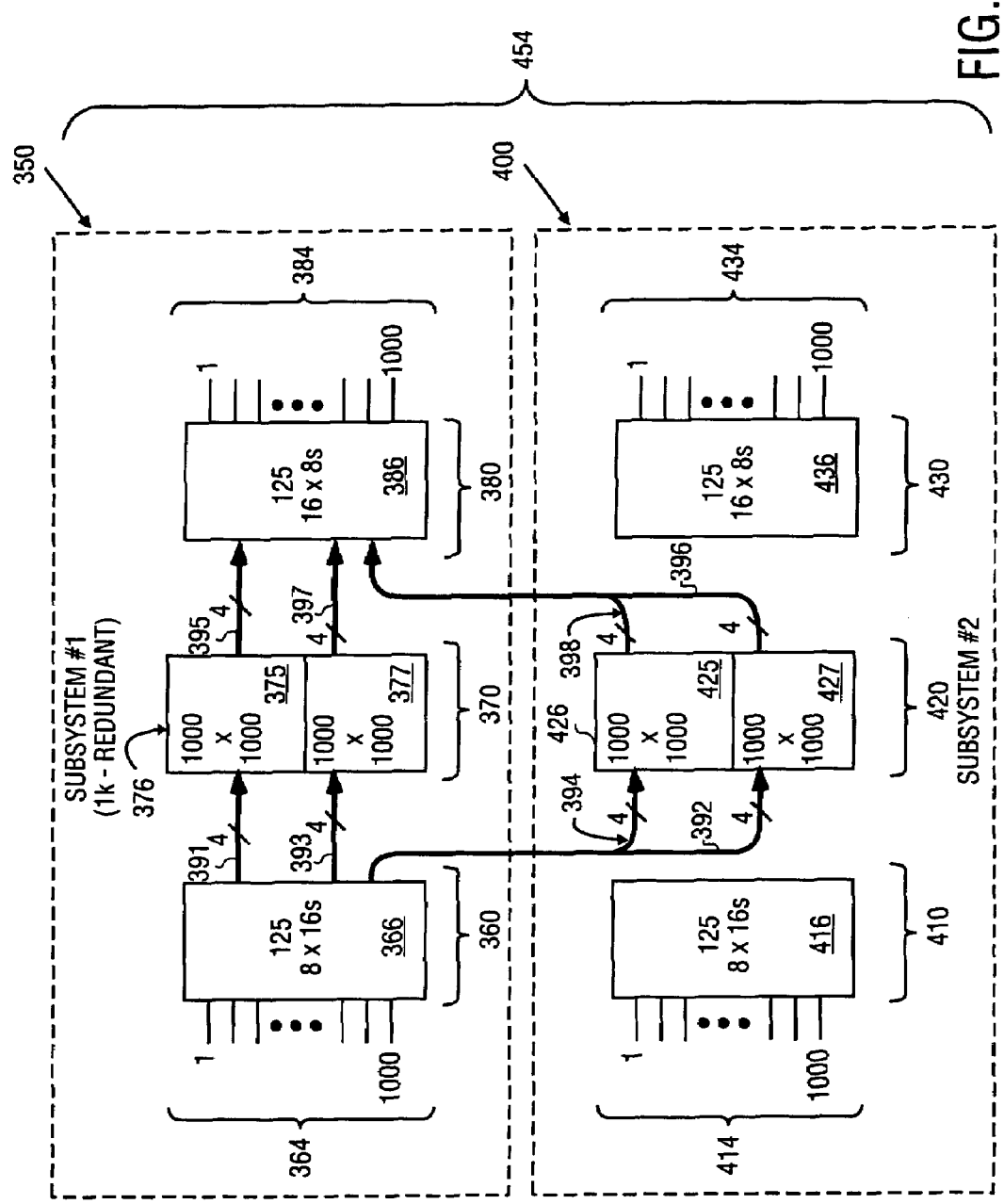
FIG. 12 shows a completed upgrade to a redundant Clos 1,000 port switch fabric.

Redundancy of the center stage switches 376 and 426 can be added by moving the extra sets of fiber bundles 392 and 396 to the 1,000 port by 1,000 port center stage switch 427 as shown in FIG. 12. Fiber cables 392 are coupled between input stage switches 366 and center stage switch 427. Fiber cables 396 are coupled between center stage switch 427 and output stage switches 386.

Figure 13:
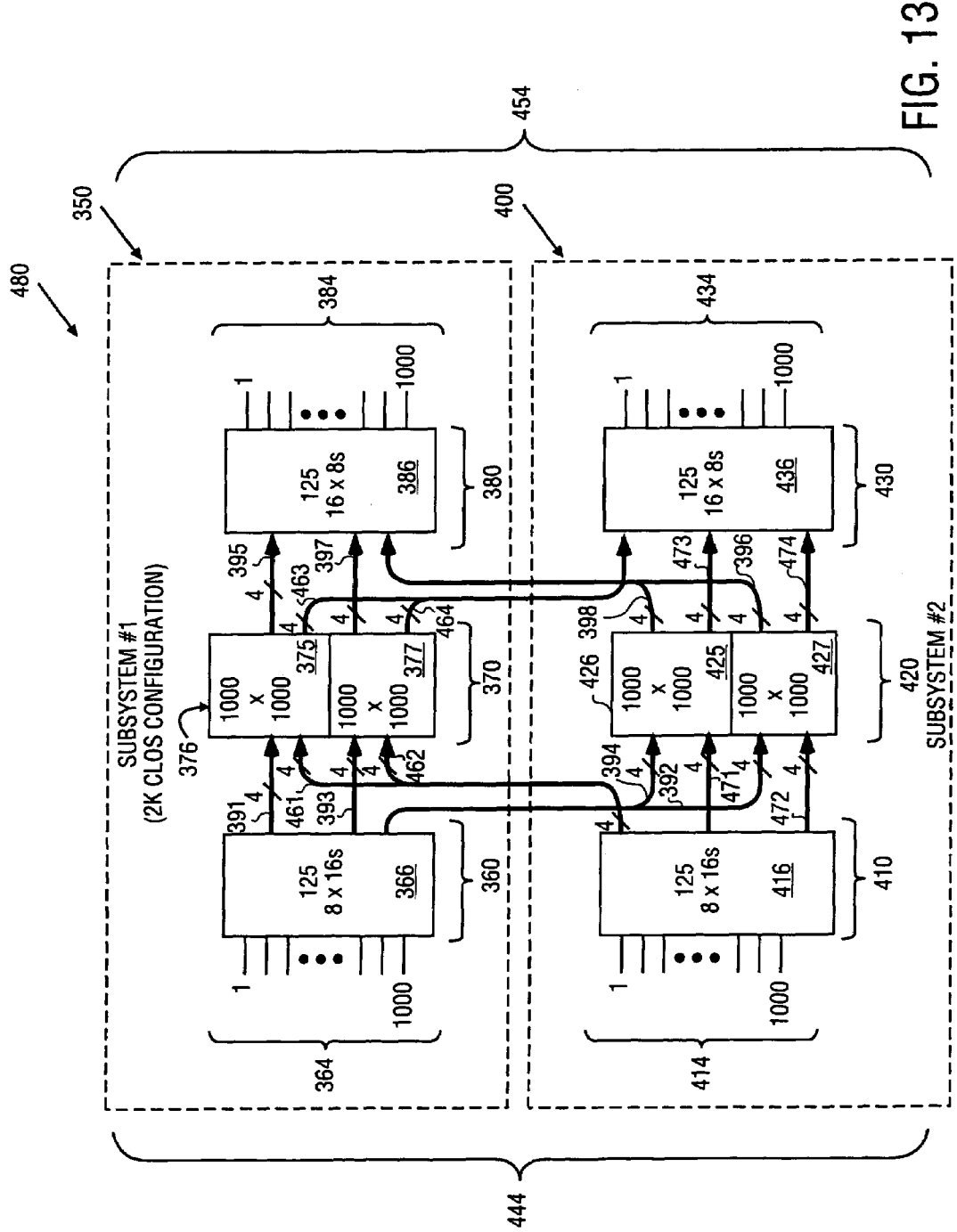
FIG. 13 shows a redundant Clos 2,000-port switch fabric configured by the addition of fiber interconnections.

The upgrade to a redundant Clos 2,000 port switch fabric 480 by the connection of fiber cables 461, 462, 463, 464, 471, 472, 473, and 474 is shown in FIG. 13. Each of the fiber cables contain 125 fibers. For Clos I/O modules, each fiber cable pair 461/463, 462/464, 471/473, and 472/474 would be combined to form a fiber cable with 250 fibers. Switch fabric 480 has 2,000 optical inputs 444 and 2,000 optical outputs 454. Four fiber cables 461 are coupled between input stage switches 416 and center stage switch 375. Four fiber cables 463 are coupled between center stage switch 375 and output stage switches 436. Four fiber cables 462 are coupled between input stage switches 416 and center stage switch 377. Four fiber cables 464 are coupled between center stage switch 377 and output stage switches 436. Four fiber cables 471 are coupled between input stage switches 416 and center stage switch 425. Four fiber cables 473 are coupled between center stage switch 425 and output stage switches 436. Four fiber cables 472 are coupled between input stage switches 416 and center stage switch 427. Four fiber cables 474 are coupled between center stage switch 427 and output stage switches 436. Switch traffic is routed through the fiber cables 391-398, 461-464, and 471-474.

Figure 14:
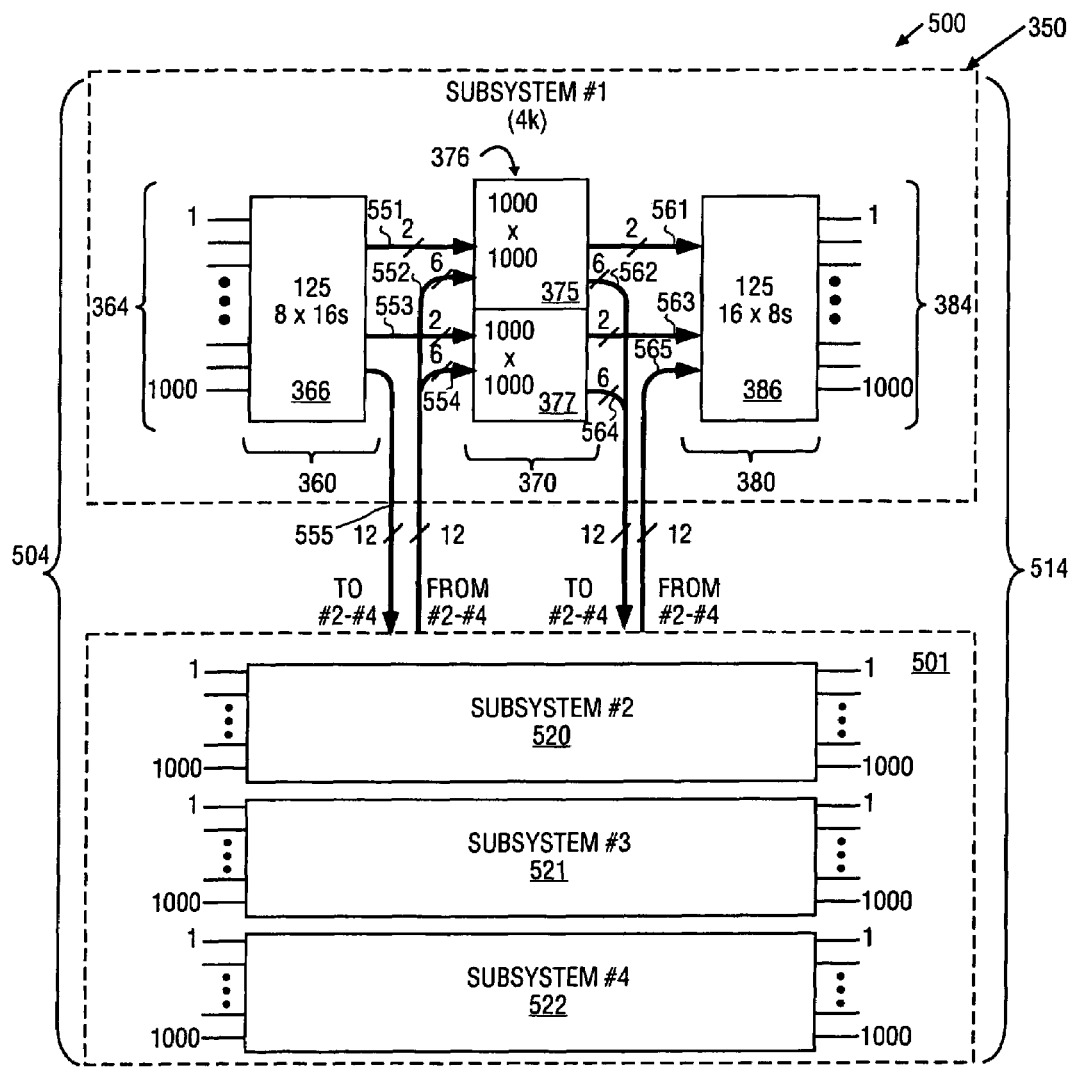
FIG. 14 shows a redundant Clos 4,000-port switch fabric configured by repositioning fiber cables.

The configuration of switch fabric subsystems into a 4,000 port optical switch fabric 500 is shown in FIG. 14. The upgrade method starts with 1,000 port optical switch fabric 350 that has been discussed above in connection with FIGS. 10 through 13.

In FIG. 14, additional switch fabric subsystems 520, 521, and 522 (i.e., respective subsystems numbers 2, 3, and 4) are added to subsystem 350 (subsystem number 1) to form switch fabric 500. Switch fabric 500 has 4,000 optical inputs 504 and 4,000 optical outputs 514. Each of the switch fabrics subsystems 350, 520, 521, and 522 has 1,000 optical inputs and 1,000 optical outputs. For the sake of simplicity, subsystems 521-522 are shown in block diagram form as residing within block 501.

Figure 15:
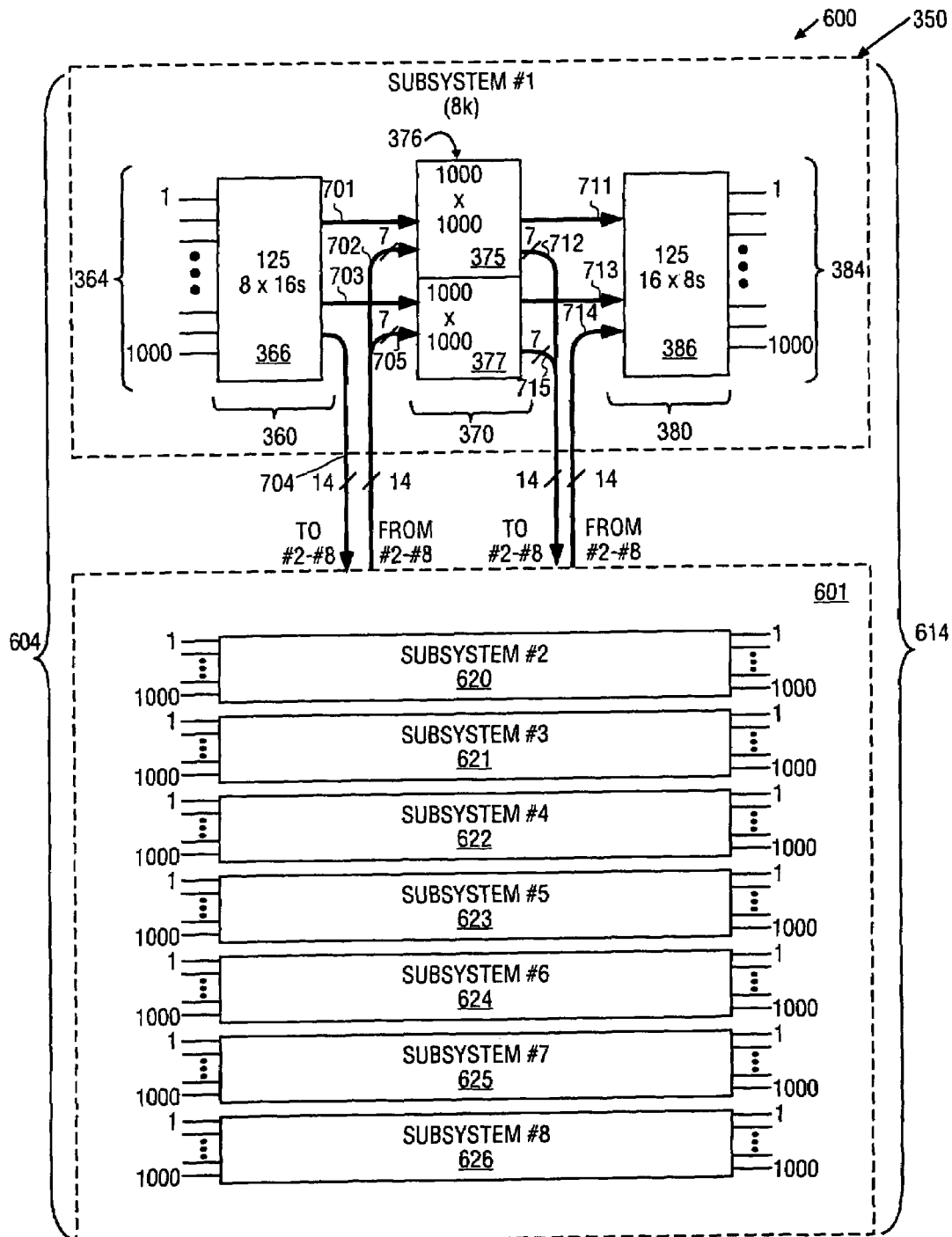
FIG. 15 shows a redundant Clos 8,000-port switch fabric.

FIG. 15 shows the configuration of switch fabric subsystems into an 8,000 port switch fabric 600. The starting point is switch fabric 350, discussed above in connection with FIGS. 10-14. Switch fabric subsystems 620 through 626 (i.e., respective subsystems numbers 2 through 8) are added to switch fabric subsystem 350 (subsystem number one) to form switch fabric 600, which has 8,000 optical inputs 604 and 8,000 optical outputs 614.

Switch fabric subsystems 620 through 626 are shown in block diagram form as part of block 601.

For the sake of simplicity, ports for test and monitoring functions are not shown in FIGS. 14 and 15 with respect to switch fabrics 500 and 600.

The methods for upgrading to the higher capacity switch fabrics 500 and 600 of FIGS. 14 and 15 by reconfiguring the fiber backplane are analogous to the method for upgrading from a 1,000 port optical switch to a 2,000 port optical switch shown in FIGS. 10-13. For switch fabrics 500 and 600, one of the center stage switches is redundant. The fiber cables to this redundant switch can be disconnected and rerouted to additional subsystems.

Traffic can be switched from one of the active center stage switches into these additional subsystems, allowing fiber cables going to the previously active switch to be rerouted into additional switch fabric subsystems. This method is repeated until the active switch fabric subsystems have been completed reconfigured. Afterward, new fiber cables are added to the new switch fabric subsystems.

The fully configured 4,000 port switch fabric 500 of FIG. 14 has four switch fabric subsystems 350, 520, 521, and 522. The 8,000 port fully configured switch fabric 600 of FIG. 15 has eight switch fabric subsystems 350, 620-626. Each of the subsystems has 1,000 optical input ports and 1,000 optical output ports.

As shown in FIG. 14, for switch fabric 500, two fiber cables 551 are coupled between input stage switches 366 and center stage switch 375. Two fiber cables 561 are coupled between center stage switch 375 and output stage switches 386. Two fiber cables 553 are coupled between input stage switches 366 and center stage switch 377. Two fiber cables 563 are coupled between center stage switch 377 and output stage switches 386.

Twelve fiber cables 555 are coupled between input stage switches 366 of switch subsystem 350 and the center stage switches of switch fabric subsystems 520 through 522.

Six fiber cables 552 are coupled between the input stage switches of subsystems 520-522 and the center stage switch 375 of subsystem 350. Six fiber cables 554 are coupled between the input stage switches of switch fabric subsystems 520-522 and center stage switch 377.

Six fiber cables 562 are coupled between center stage switch 375 and the output stage switches of switch fabric subsystems 520-522. Six fiber cables 564 are coupled between center stage switch 377 and the output stage switches of subsystems of 520-522.

Twelve fiber cables 565 are coupled between the center stage switches of subsystems 520-522 and the output stage switches 386.

Each of the fiber cables 551-555 and 561-565 contains 125 fibers. For an embodiment with Clos I/O modules, the combined fiber pairs 551/561, 552/562, 553/563, 554/564, and 555/565 have 250 fibers.

For the switch fabric 600 of FIG. 15, fiber cable 701 is coupled between input stage switches 366 and center stage switch 375. Fiber cable 703 is coupled between input stage switches 366 and center stage switch 377. Fiber cable 711 is coupled between center stage switch 375 and output stage switches 386. Fiber cable 713 is coupled between center stage switch 377 and output stage switches 386.

Fourteen fiber cables 704 are coupled between input stage switches 366 of switch fabric 350 and the center stage switches of subsystem 620 and the center stage switches of switch fabric subsystems 620 through 626. Seven fiber cables 702 are coupled between the input stage switches of subsystems 620-626 and center stage switch 375. Seven fiber cables 705 are coupled between the input stage switches of subsystems 620 through 626 and center stage switch 377.

Seven fiber cables 712 are coupled between center stage switch 375 and the output stage switches of subsystems 620 through 626. Seven fiber cables 715 are coupled between center stage switch 377 and the output stage switches of subsystems 620 through 626.

Fourteen fiber cables 714 are coupled between the center stage switches of subsystems 620 through 626 and output stage switches 386.

Each of the fiber cables 701-705 and 711-715 contains 125 fibers. For an embodiment with Clos I/O modules, each combined fiber cable pair 701/711, 702/712, 703/713, 704/714, and 705/715 has 250 fibers.

Figure 16:
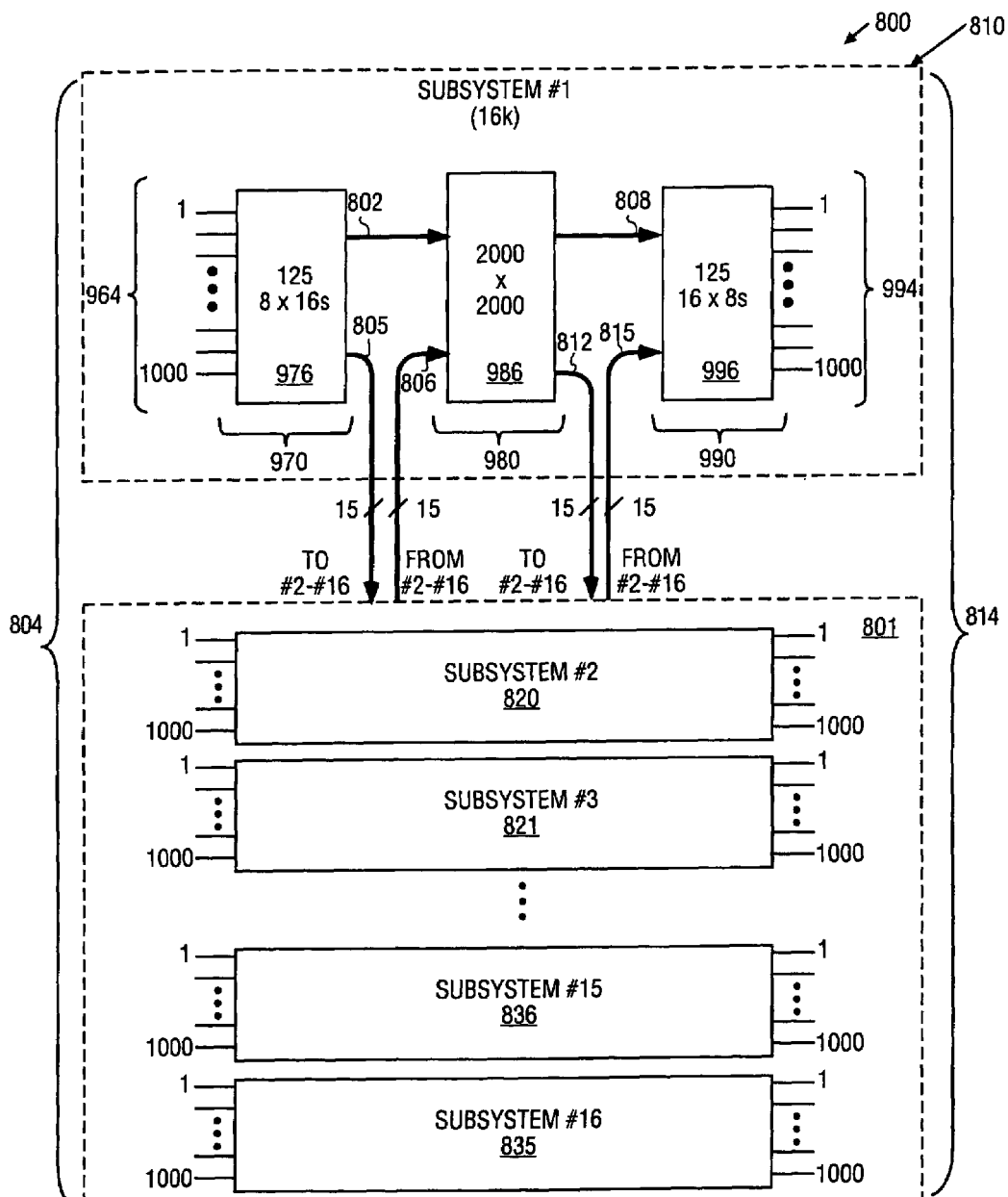
FIG. 16 shows a redundant 16,000 port Clos switch fabric configured by upgrading center stage switches from 1,000-ports to 2,000-ports.

The 8,000 port Clos switch fabric 600 of FIG. 15 can be upgraded to the 16,000 port switch fabric 800 of FIG. 16. Switch fabric 800 has 16,000 optical input ports 804 and 16,000 optical output ports 814. Switch fabric 800 has sixteen switch fabric subsystems. The starting point is switch fabric subsystem 810, which is subsystem number one. Subsystem 810 has an input stage 970, a center stage 980, and an output stage 990. Switch fabric subsystem 810 includes 125 eight port by sixteen port input stage switches 976 and 125 sixteen port by eight port output stage switches 996. An additional fifteen switch fabric subsystems 820 through 835 (i.e., subsystems numbers 2-16) are coupled to subsystem 810. The switch fabric subsystems 820 through 835 are shown in block diagram form as part of block 801.

For the sake of simplicity, the ports for test and monitoring functions are not shown as part of switch fabric 800 in FIG. 16.

The 8,000 port switch fabric 600 shown in FIG. 15 is upgraded to 16,000 port switch fabric 800 by replacing each pair of 1,000 port center stage switches of switch fabric 600 with a single 2,000 port center stage switch. Thus, subsystem 810 of FIG. 16 includes a 2,000 port by 2,000 port center stage switch 986. Each of the additional subsystems 820 through 835 also contains a 2,000 port by 2,000 port center stage switch. Each of the 2,000 port by 2,000 port center stage switches (including center stage switch 986) has a total of sixteen fiber input connectors and sixteen fiber output connectors, each of the fiber connectors having 250 fibers.

For fully configured switch fabric 800, fiber cable 802 couples input stage switches 976 to center stage switch 986. Fiber cable 808 couples center stage switch 986 with output stage switches 996.

Fifteen fiber cables 805 couple input stage switches 976 to the center stage switches of switch fabric subsystems of 820 through 835. Fifteen fiber cables 806 couple the center stage switches of switch fabric subsystems 820 through 835 to center stage switch 986.

Fifteen fiber cables 812 couple center stage switch 986 to the center stage switches of switch fabric subsystems 820 through 835. The fifteen fiber cables 815 couple the center stage switches of switch fabric subsystems 820 through 835 to the output stage switches 996.

Fiber cables 802 and 808 have 125 fibers. Each of fiber cables 805, 806, 812, and 815 consist of 15 cables each with 125 fibers. Each of the fiber cables 805, 806, 812, and 815 consist of 15 cables each with 125 fibers. For an embodiment with Clos input/output modules, input cable 802 and output cable 808 can be combined into one cable with 250 fibers. Similarly, input and output cables 805 and 815 or input and output cables 806 and 812 can be combined into 15 groups each with 250 fibers.

The upgrade methods described above in connection with FIGS. 9-15 do not interrupt working optical signals. For alternative embodiments, the switch capacity upgrades could still be employed even if working optical signals were interrupted or switched off.

For alternative embodiments, the fiber backplane upgrade approaches of FIGS. 9-16 could be used for smaller or larger switch fabrics.

For yet other alternative embodiments, the fiber backplane approaches of FIGS. 9-16 could operate in reverse in order to downgrade switch fabric capacity. For example, with respect to FIGS. 9-13, a fiber backplane downgrade would entail rerouting traffic to fiber cables 391-397, removing fiber cables 461-464 and 471-474, rerouting traffic away from fiber cables 392 and 396, moving fiber cables 392 and 396 from center stage switch 427 to center stage switch 375, rerouting traffic away from fiber cables 394 and 398, moving fiber cables 394 and 398 from center stage switch 425 to center stage switch 377, and rerouting traffic through fiber cables 391-398. The switch fabric would thereby be downgraded from a redundant Clos 2,000 port switch fabric with two switch subsystems to a 1,000 port switch fabric with one switch subsystem. Similar approaches could be used to downgrade the 4,000 port, 8,000 port, and 16,000 port switch fabrics shown in respective FIGS. 14-16.

Although embodiments of the invention have been described that specify, for example, the number of optical inputs, optical outputs, the number of fiber cables and fibers, the number of switch stages, and the number of switch subsystems, it is to be appreciated that other embodiments are contemplated that include different numbers of inputs, outputs, fiber cables, fibers, subsystems, and stages, etc. Although for some embodiments, ports for testing and monitoring functions were not shown for the sake of simplicity, it is to be appreciated that for various embodiments the ports for the testing and monitoring functions can be included and can have various numbers of lasers, detectors, and fiber inputs and outputs. Furthermore, although particular upgrade methods have been described with respect to specific number of ports, input switches, output switches, center stage switches, and subsystems, other upgrade methods are contemplated that involve different numbers of input switches, center stage switches, output stage switches, input ports, output ports, and subsystems. Although particular Clos input/output modules have been discussed, Clos input/output modules of different sizes with different numbers of inputs and outputs, different numbers of mirror arrays, and different number of fibers, detectors, taps, and lasers are contemplated.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An optical switch fabric comprising:
   an input stage;
   an output stage; and
   a center stage comprising
      a minimum number of center switches greater than one that cause the optical switch fabric to be strict-sense nonblocking; and
      at least one additional center switch to provide redundancy for the optical switch fabric, wherein the input stage, the center stage, and the output stage are coupled in a cascaded manner and each of the center switches contain microelectromechanical mirrors.

2. The optical switch fabric of claim 1, wherein the input stage, center stage, and output stage comprise a Clos network.

3. The optical switch fabric of claim 2, wherein the input stage has N inputs and K switches, wherein each of the K switches of the input stage has P inputs and at least 2P outputs, wherein the center stage has at least 2P switches, wherein each of the 2P or more switches of the center stage has K inputs and K outputs, wherein the output stage has N outputs and K switches, wherein each of the K switches of the output stage has at least 2P inputs and P outputs, wherein N, K, and P are integers, wherein P is at least 2 and K is at least 4.

4. The optical switch fabric of claim 3, wherein P is 8.

5. The optical switch fabric of claim 3, wherein K is one of 250, 256, 500, 512, 1,000, and 1,024.

6. The optical switch fabric of claim 3, wherein N is one of 1,000, 1,024, 2,000, 2,048, 4,000, 4,096, 8,000, 8,192, 16,000, and 16,384.

7. The optical switch fabric of claim 1, wherein the input stage and the output stage each comprise switches that contain microelectromechanical mirrors.

8. The optical switch fabric of claim 3, wherein each of the K switches of the input stage further includes additional inputs for optical test sources.

9. The optical switch fabric of claim 3, wherein one or more of the K switches of the output stage further includes additional outputs for monitoring of optical signals.

10. The optical switch fabric of claim 3, wherein one or more of the K switches of the input stage further includes additional outputs for optical signal monitoring.

11. The optical switch fabric of claim 3, wherein each of the switches of the center stage further includes additional outputs for monitoring of optical signals.

12. The optical switch fabric of claim 1, wherein the input stage further comprises at least one free-space beam splitter for substantially noninvasive monitoring of at least one optical signal.

13. The optical switch fabric of claim 1, wherein the center stage further comprises at least one free-space beam splitter for substantially noninvasive monitoring of at least one optical signal.

14. The optical switch fabric of claim 1, wherein the output stage further comprises at least one free-space beam splitter for substantially noninvasive monitoring of at least one optical signal.

15. The optical switch fabric of claim 1, wherein fiber lines are coupled to inputs and outputs of the input stage, the center stage, and the output stage.

16. The optical switch fabric of claim 3, further comprising a mechanical housing containing beams from at least one of the switches of the input stage and from at least one of the switches of the output stage.

* * * * *